(12) United States Patent
Morishita et al.

(10) Patent No.: US 9,946,655 B2
(45) Date of Patent: Apr. 17, 2018

(54) STORAGE SYSTEM AND STORAGE CONTROL METHOD

(71) Applicant: Hitachi, Ltd., Tokyo (JP)

(72) Inventors: Noboru Morishita, Tokyo (JP); Shintaro Kudo, Tokyo (JP); Yusuke Nonaka, Tokyo (JP); Akira Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 19 days.

(21) Appl. No.: 14/765,442

(22) PCT Filed: Oct. 9, 2013

(86) PCT No.: PCT/JP2013/077483
§ 371 (c)(1),
(2) Date: Aug. 3, 2015

(87) PCT Pub. No.: WO2015/052798
PCT Pub. Date: Apr. 16, 2015

(65) Prior Publication Data
US 2015/0370713 A1 Dec. 24, 2015

(51) Int. Cl.
*G06F 12/00* (2006.01)
*G06F 12/0868* (2016.01)
(Continued)

(52) U.S. Cl.
CPC .......... *G06F 12/0868* (2013.01); *G06F 3/065* (2013.01); *G06F 3/067* (2013.01);
(Continued)

(58) Field of Classification Search
CPC ............. G06F 12/0813; G06F 12/0866; G06F 12/0831
See application file for complete search history.

(56) References Cited

U.S. PATENT DOCUMENTS

| 7,313,724 B1 * | 12/2007 | Kekre ................ G06F 11/2082 714/12 |
| 2006/0085610 A1 * | 4/2006 | Iwamura ............ G06F 11/1662 711/162 |

(Continued)

FOREIGN PATENT DOCUMENTS

| JP | 07-328072 A | 12/1995 |
| JP | 09-146842 A | 6/1997 |

OTHER PUBLICATIONS

International Search Report of PCT/JP2013/077483.

*Primary Examiner* — Ryan Bertram
*Assistant Examiner* — Trang K Ta
(74) *Attorney, Agent, or Firm* — Mattingly & Malur, PC

(57) ABSTRACT

In a storage system, first and second controllers have respective first and second buffer and cache areas. The first controller stores write data in accordance with a write request in the first cache area without involving the first buffer area and to transfer the stored write data to the second cache area without involving the second buffer area. The first controller is configured to determine which of the first and second cache areas is to be used as a copy source and to be used as a copy destination depending on whether the storing of the first write data in the first cache area had been successful or on whether the transfer of the write data from the first cache area to the second controller had been successful, and by copying data from the copy source to the copy destination, recovers data in an area related to a transfer failure.

20 Claims, 18 Drawing Sheets

(51) Int. Cl.
  *G06F 13/10* (2006.01)
  *G06F 3/06* (2006.01)
  *G06F 11/14* (2006.01)
  *G06F 12/0895* (2016.01)

(52) U.S. Cl.
  CPC ............ *G06F 3/0619* (2013.01); *G06F 11/14* (2013.01); *G06F 12/0895* (2013.01); *G06F 13/10* (2013.01); *G06F 2212/1016* (2013.01); *G06F 2212/1041* (2013.01); *G06F 2212/283* (2013.01); *G06F 2212/313* (2013.01)

(56) References Cited

U.S. PATENT DOCUMENTS

| | | | | |
|---|---|---|---|---|
| 2006/0242451 | A1* | 10/2006 | Ausserlechner | G06F 11/1008 714/1 |
| 2008/0104344 | A1* | 5/2008 | Shimozono | G06F 11/1441 711/162 |
| 2008/0104347 | A1* | 5/2008 | Iwamura | G06F 11/2076 711/162 |
| 2008/0177954 | A1* | 7/2008 | Lee | G06F 12/126 711/154 |
| 2009/0254582 | A1* | 10/2009 | Karamanolis | G06F 3/0617 |
| 2011/0258391 | A1* | 10/2011 | Atkisson | G06F 11/108 711/118 |
| 2012/0011326 | A1* | 1/2012 | Higashijima | G06F 12/0804 711/142 |
| 2012/0260034 | A1* | 10/2012 | Primadani | G06F 11/1076 711/113 |
| 2014/0281123 | A1* | 9/2014 | Weber | G06F 12/0246 711/103 |

* cited by examiner

| # | Procedure | Data state and transfer mode | | Data recovery method upon failure during write (X: Case X, Y: Case Y) |
|---|---|---|---|---|
| | | Case X | Case Y | |
| | | No cache data OR (cache data exists AND (clean OR parity generated dirty)) | Cache data exists AND parity ungenerated dirty | |
| 1 | During write, only two-stage transfer | Two-stage transfer (without guarantee code verification) | Two-stage transfer (with guarantee code verification) | X: discard write data, Y: discard write data in (1-1) to (1-2) and retransfer from buffer area to CS area in (1-3) to (1-6) |
| 2 | During write, two-stage transfer AND direct transfer | Direct transfer (without guarantee code verification) | Two-stage transfer (with guarantee code verification) | X: discard write data, Y: discard write data in (1-1) to (1-2) and retransfer from buffer area to CS area in (1-3) to (1-6) |
| 3 | During write, only direct transfer | Direct transfer (without guarantee code verification) | Direct transfer (with guarantee code verification) | X: discard write data, Y: overwrite from other controller to CS area of host controller in (1-1) to (1-2) and overwrite from host controller to CS area of other controller in (1-3) to (1-5) |

STORAGE SYSTEM AND STORAGE CONTROL METHOD

TECHNICAL FIELD

The present invention relates to a technique for writing write data from a host to a cache area of a storage system.

BACKGROUND ART

A storage system is known which reports a write end to a host computer when receiving a write request from the host computer and storing write data accompanying the write request in a cache memory area (hereinafter, a cache area). In addition, a storage system is also known which multiplexes (generally, duplexes) write data stored in a cache area to improve protection of the write data with respect to failures such as a power loss.

According to PTL1, when duplexing write data from the host computer, data protection is realized without sacrificing performance by eliminating exclusive control among a plurality of controllers having cache areas.

According to PTL2, in a storage system which stores user data by adding redundant data such as a parity to the user data, by storing updated data (write data) from the host computer in a different cache area from data prior to the update (old data), access to a storage apparatus during generation of the redundant data is reduced and processing efficiency of the storage system is improved.

CITATION LIST

Patent Literature

[PTL1]
Japanese Patent Application Laid-open No. H9-146842
[PTL2]
Japanese Patent Application Laid-open No. H7-328072

SUMMARY OF INVENTION

Technical Problem

The following procedures (A) and (B) are available as data transfer modes when storing write data from a host computer in a cache area of a storage system.
(A) The write data from the host computer is temporarily stored in a buffer area included in an FE-I/F (front end communication interface device) of the storage system, and when the stored write data reaches a certain data amount, the write data is collectively transferred to the cache area.
(B) The write data from the host computer is stored in the cache area of the storage system without involving the buffer area included in the FE-I/F.

Generally, with some mid-range class storage systems and all high-end class storage systems, the procedure (A) is often used since collectively transferring write data reduces a decline in transfer efficiency of a data transfer path inside the storage system. With mid-range class storage systems, microprograms are appropriated from high-end class storage systems for the purposes of acquiring more advanced functions and facilitating development and, at the same time, progress has been made in simplifying hardware and sharing hardware with servers and the like for the purpose of cost reduction. As a part of such efforts, a cache area for storing user data and a buffer area used for data transfer which have conventionally been physically separated from one another are consolidated in a memory that is directly coupled to a processor.

With a hardware configuration including such a memory, when executing a data transfer between the host computer and the storage system according to the procedure (A) that involves the buffer area, an amount of data input/output at the consolidated memory may increase and cause a decline in performance. Therefore, conceivably, the data transfer between the host computer and the storage system is desirably executed according to the procedure (B) that does not involve the buffer area.

Meanwhile, when write data is being received from the host computer, the transfer of the write data from the host computer may be suspended due to a failure between the host computer and the storage system or the like. In this case, while the storage system returns an error in response to a write request from the host computer and the host computer is expected to retry the write request, when the failure between the host computer and the storage system is caused by a disconnection of a path or the like, it is difficult for the host computer to retry the write request.

At this point, in the case of the procedure (A) that involves the buffer area, even if the transfer of the write data is suspended, discarding data in the buffer area may suffice. However, in the case of the procedure (B) that does not involve the buffer area, a part of the write data whose transfer is suspended and data prior to the write data being written may coexist in the cache area of the storage system.

Therefore, a problem with the procedure (B) which must be addressed is to correctly maintain user data stored in the cache area of the storage system even when a transfer of write data from a host computer is suspended due to a failure factor that prevents a write request from the host computer from being retried during reception of the write data from the host computer.

Solution to Problem

A storage system is configured to include a storage device group constituted by one or more storage devices, a first controller which is coupled to the storage device group and a host computer and which includes a first buffer area and a first cache area, and a second controller which is coupled to the storage device group and the host computer and which includes a second buffer area and a second cache area. The first controller is configured to receive a write request from the host computer, store write data in accordance with the write request in the first cache area without involving the first buffer area, transfer the write data stored in the first cache area to the second controller in order to store the write data in the second cache area without involving the second buffer area, and write the write data in the first cache area in the storage device group. The first controller is configured to manage whether or not a state of a first cache sub area is a first suspended state that is cleared when storing of first write data in the first cache sub area is successful, and the first or second controller is configured to manage whether or not a state of a second cache sub area is a second suspended state that is cleared when a transfer of write data from the first cache sub area to the second cache sub area is successful. The first controller is configured to perform a suspended state recovery process. A suspension recovery process includes determining whether or not the first cache sub area is in the first suspended state and the second cache sub area is in the second suspended state. In addition, the suspension recovery process includes configuring the first cache sub area as a copy destination, configuring the second cache sub area as a copy source, copying data from the copy source to the copy destination, and clearing the first and second suspended states that respectively correspond to the first and second cache sub areas when the first cache sub area is in the first suspended state and the second cache sub area is in the second suspended state. Furthermore, the suspension recovery process includes configuring the second cache sub area as a copy destination, configuring the first cache sub area as a copy source, copying data from the copy source to the copy destination, and clearing the second suspended state that corresponds to the second cache sub area when the first cache sub area is not in the first suspended state and the second cache sub area is in the second suspended state.

Advantageous Effects of Invention

In a procedure of transferring write data from a host computer to a cache area without involving a buffer area, user data stored in the cache area can be correctly maintained even when a transfer of the write data from the host computer is suspended while the write data is being received from the host computer.

BRIEF DESCRIPTION OF DRAWINGS

FIG. 15 shows an example of a comparison of characteristics of write transfer procedures according to the example.

DESCRIPTION OF EMBODIMENTS

Figure 1:
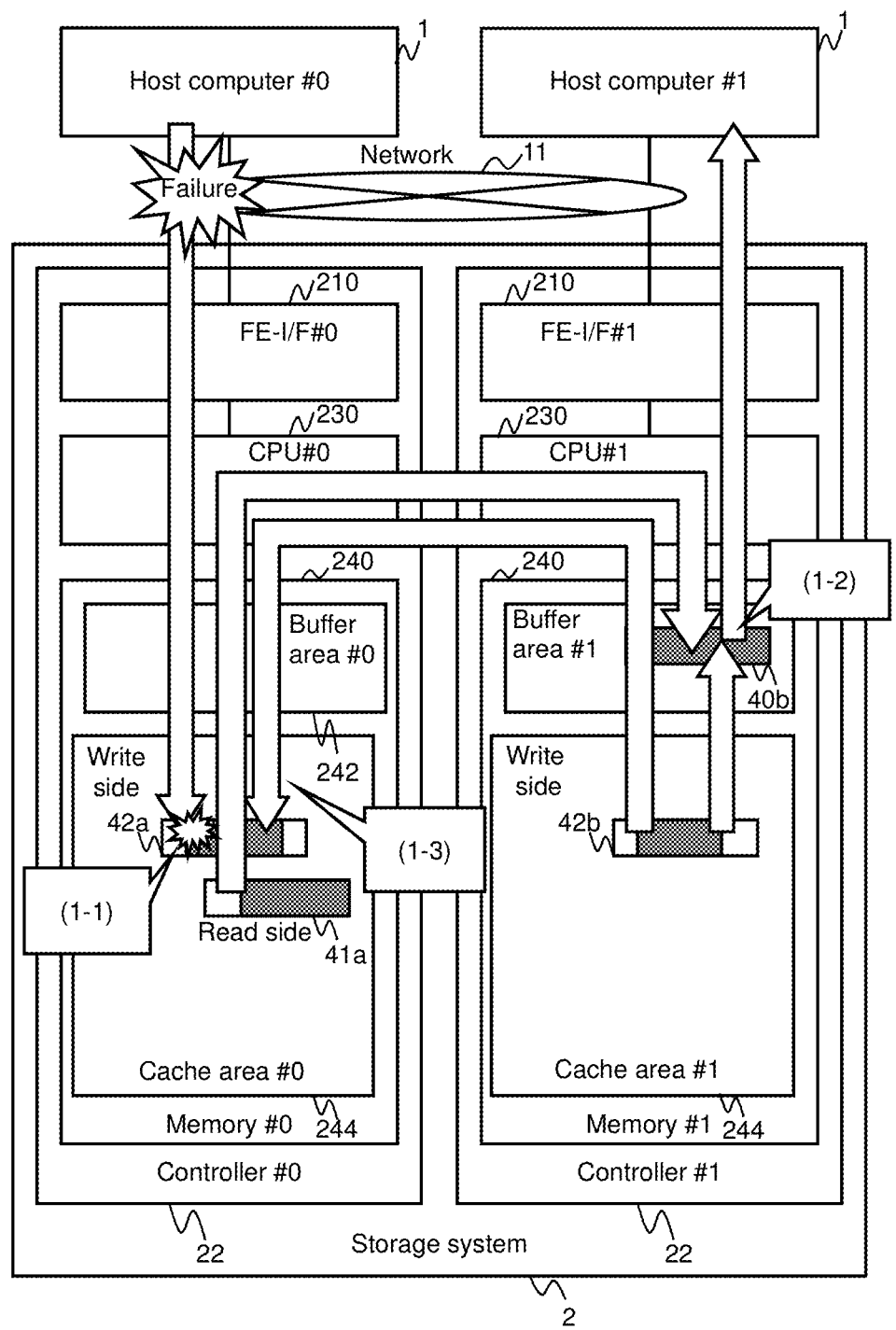
FIG. 1 shows an outline of an example.

Hereinafter, an example will be described.

Although information will be described below using expressions such as an "xxx table", information may be expressed using any kind of data structure. In other words, an "xxx table" can also be referred to as "xxx information" in order to show that information is not dependent on data structure.

In addition, while a "program" is sometimes used as a subject to describe processing in the following description, since a program causes prescribed processing to be performed while using a storage resource (for example, a memory) and/or a communication interface device (for example, a communication port) as appropriate by being executed by a processor (for example, a CPU (Central Processing Unit)) included in a control device, a processor, or a controller or an apparatus (for example, a storage system) including the processor may be used instead as a subject of processing. Processing performed by a processor may be partially or entirely realized by dedicated hardware. A computer program may be installed into a control device from a program source. The program source may be, for example, a program distribution server or a storage medium.

Furthermore, in the following description, when describing elements of a same type by distinguishing the elements from one another, identifiers (for example, numerals) assigned to the elements may be used in place of a reference sign of the elements. For example, when controllers are to be described without particularly distinguishing the controllers from one another, a description of "controller 22" may be used, and when individual controllers are to be described by distinguishing the controllers from one another, a description of "controllers #0 and #1" or the like may be used.

In addition, while numerals, names, or the like are used as identification information of various targets (for example, VOL) in the following description, the numerals, the names, or the like may be interchangeable or other types of identification information may be used instead.

Furthermore, terms used in the description below are defined as follows.

(*) "VOL" is an abbreviation of logical volume and refers to a logical storage device. A VOL may be a real VOL (RVOL) or a virtual VOL (VVOL). In addition, a VOL may include an online VOL that is provided to an external apparatus (for example, a host computer) coupled to a storage system providing the VOL and an offline VOL that is not provided to an external apparatus (that is not recognized by an external device).

(*) "RVOL" is a VOL based on a physical storage resource (for example, a RAID (Redundant Array of Independent (or Inexpensive) Disks) group that is constituted by a plurality of PDEVs) included in the storage system that includes the RVOL.

(*) "RG" is an abbreviation of a RAID group.

(*) Examples of "VVOL" may include an externally coupled VOL (EVOL) that is a VOL which is based on a storage resource (for example, a VOL) of an external storage system coupled to a storage system comprising the VVOL, a VOL (TPVOL) which is constituted by a plurality of virtual pages (virtual storage areas) and which conforms to a capacity virtualization technique (typically, Thin Provisioning), and a snapshot VOL that is provided as a snapshot of an original VOL. A TPVOL is typically an online VOL. A snapshot VOL may be an RVOL.

(*) "PDEV" is an abbreviation of a non-volatile physical storage device. A plurality of PDEVs may constitute a plurality of RAID groups. A RAID group may be referred to as a parity group.

(*) A "pool" refers to a logical storage area (for example, a set of a plurality of pool VOLs) and may be prepared for each intended use. For example, pools may include a TP pool and a snapshot pool. A TP pool is a storage area constituted by a plurality of real pages (real storage areas). A real page may be allocated from a TP pool to a virtual page of a TPVOL. A snapshot pool may be a storage area in which data saved from an original VOL is stored. A pool (typically, a TP pool) may include a plurality of tiers with different performances (for example, I/O performances). Each tier may be constituted by one or a plurality of pool VOLs with similar I/O performances.

(*) A "pool VOL" refers to a VOL that is a component of a pool. A pool VOL may be an RVOL or an EVOL. A pool VOL is typically an offline VOL.

(*) A "buffer area" is constituted by a plurality of buffer sub-areas. Areas are reserved in units of buffer sub-areas from a buffer area. Hereinafter, a buffer sub-area will be described as a "BS area".

(*) A cache area (a cache memory area) is constituted by a plurality of cache sub-areas. Areas are reserved in units of cache sub-areas from a cache area. Hereinafter, a cache sub-area will be described as a "CS area".

First, an outline of the example will be described.

FIG. 1 shows an outline of the example.

A host computer 1 (#0, #1) is coupled to a storage system 2 via a communication network 11. A redundant controller 22 (duplexed controllers #0 and #1) exists in the storage system 2 in order to ensure redundancy of data. The controllers #0 and #1 are coupled to one another.

Each controller 22 (#0, #1) includes an FE-I/F 210 (#0, #1), a CPU 230 (#0, #1), and a memory 240 (#0, #1). The memory 240 has a buffer area 242 (#0, #1) and a cache area 244 (#0, #1). The buffer area 242 is a storage area in which data inputted/outputted to/from the cache area 244 is temporarily stored. Data read from the buffer area 242 is to be deleted from the buffer area 242. On the other hand, the cache area 244 is a storage area in which data inputted/outputted to/from the PDEV (RG) is temporarily stored. Unlike the buffer area 242, even if data is read from the cache area 244, the read data is not necessarily deleted from the cache area 244. While the buffer area 242 and the cache area 244 may be distributed among different memories, in the present example, the buffer area 242 and the cache area 244 are consolidated in the memory 240. In the cache area 244, a read side 41 (41a) may be reserved as an area in which data read from a PDEV (RG) is written or a write side 42 (42a, 42b) may be reserved as an area in which data to be written in a PDEV (RG) is written. In the description of the present example, unless specifically noted, both a read side and a write side are areas (typically, CS areas) that exist in the cache area 244.

In addition, it is assumed that the following prerequisites apply to the description below.
(1) Data (data A to be described later) that is stored in the cache area #0 of the controller #1 is copied to the cache area #1 of the controller #1.
(2) The FE-I/F 210 does not have a buffer area that can be actively utilized during writing and reading. Therefore, write data transmitted from the host computer 1 is transmitted to the cache area 244 of the memory 244 via the FE-I/F 210. In doing so, the write data is not stored in the buffer area 242 of the memory 244.

In the following description, a transfer of write data to the cache area 244 without involving a buffer area will be referred to as a "write direct transfer". Hereinafter, processing that is performed when a read request or a write request is received by the storage system 2 from the host computer 1 during execution of a write direct transfer will be described.

When the controller #0 receives a write request from the host computer #0, the CPU #0 reserves a storage area (the write side 42a) of the write data from the cache area #0 and, at the same time, reserves a storage area (the write side 42b) that is a copy destination of data stored in the write side 42a from the cache area #1 via the controller #1.

Subsequently, the CPU #0 of the controller #0 stores the write data in the write side 42a via the FE-I/F #0.

When a write request is received, there may be cases where write data (hereinafter, data A) in accordance with another write request (for example, a previous write request that had specified a same area (for example, an area in a VOL)) already exists in the write side 42a and where the data A is (parity ungenerated) dirty data. Dirty data refers to data not destaged in a storage device (data not existing in a storage device).

When a failure occurs on a path such as the network 11 when new write data (data B) is being received by the controller #0 from the host computer #0, FE-I/F #0 destroys the dirty data (the data A) in the write side 42a (1-1). In other words, the data A that is overwritten by the data B becomes different data (hereinafter, data C) in which only a part of the data A is overwritten by a part of the data B. Since parity with respect to the data A is ungenerated, the data A cannot be restored.

When the controller #1 receives a read request in which a write destination area of the data A is set as a read source area from the host computer #1 in a state where the dirty data A is destroyed by the data B, the CPU #1 of the controller #1 reads the dirty data A from the write side 42b to the buffer area #1 to integrate the dirty data A with clean data A in the read side 41a and transfers the data A from the buffer area #1 to the host computer #1 (1-2). Moreover, when all of data in an address range of a read request exists in the write side 42b, a read direct transfer is performed in which data is directly transferred from the write side 42b to the host #1.

When the controller #0 receives a write request from the host computer #0 in a state where the dirty data (the data A) is destroyed after the failure of the path such as the network 11 has been rectified, before executing the write request, the CPU #0 restores the data C in the write side 42a to the data A using the data A (the dirty data A that has not been destroyed) stored in the write side 42b of the controller #1 (in other words, the CPU #0 overwrites the data C in the write side 42a using the data A in the write side 42b) (1-3).

At this point, after causing the CPU #1 to overwrite the data C using the data A stored in the write side 42b, the CPU #0 executes the write request with respect to the data A stored in the cache area #0.

Due to the processing described above, even during the execution of a write direct transfer, by exchanging data among the controllers 22 with respect to read/write requests from the host computer 1 in accordance with a state of data stored in the cache area 244, access to the data from the host computer 1 can be maintained.

The present example can be outlined as described above. Hereinafter, the present example will be described in detail.

Figure 2:
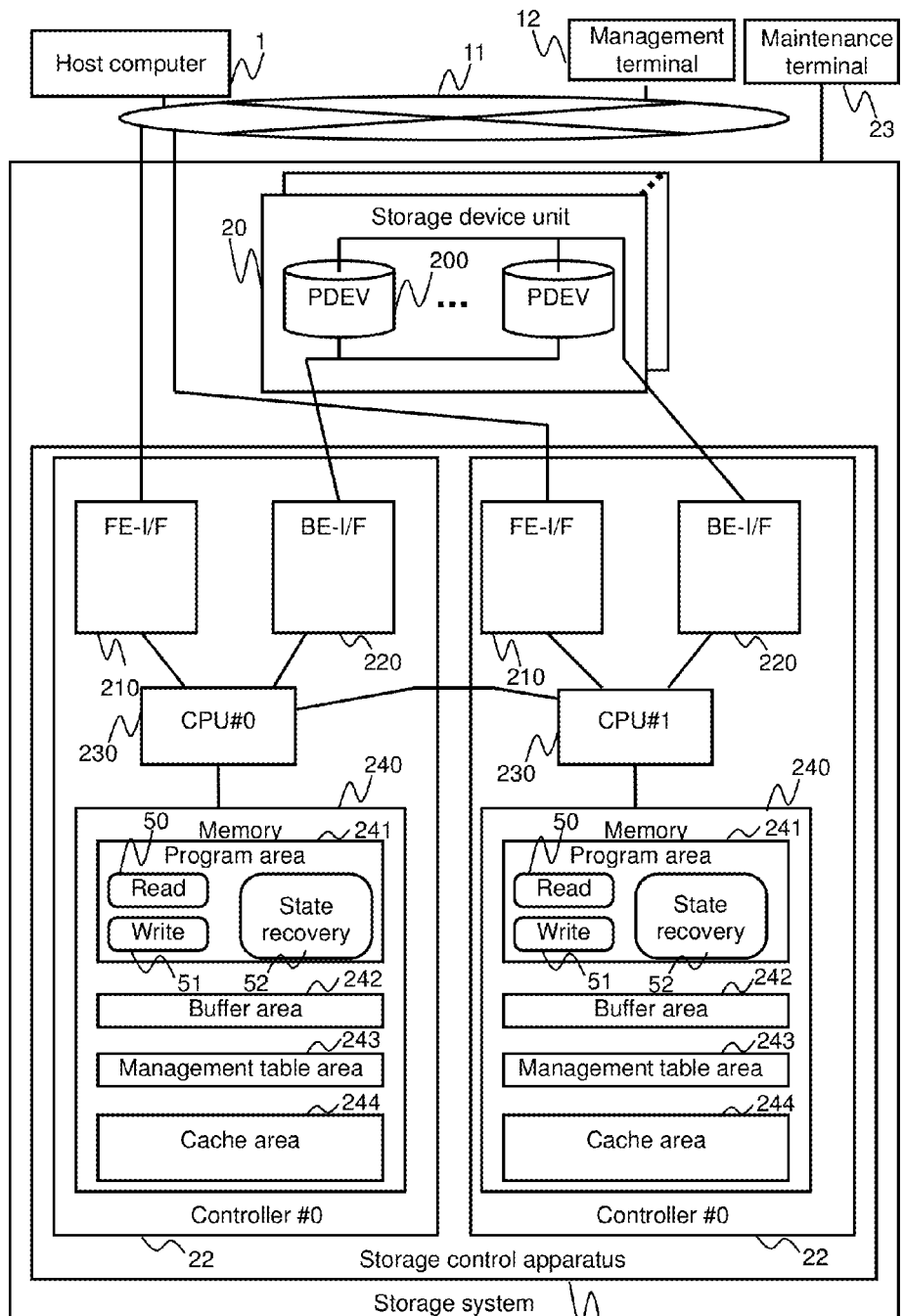
FIG. 2 shows an example of a computer system according to the example.

FIG. 2 shows an example of a computer system according to the example.

The computer system comprises the host computer 1, a management terminal 12, a maintenance terminal 23, and the storage system 2.

The host computer 1, the management terminal 12, and the maintenance terminal 23 are coupled to the FE-I/F 210 of the storage system 2 via the network 11 (for example, a SAN (Storage Area Network)).

The storage system 2 includes a storage control apparatus 21 and a storage device unit 20. The storage control apparatus 21 includes the controller 22. The controller 22 includes a communication interface, a storage device, and a processor coupled to the communication interface and the storage device. Examples of the communication interface include the FE-I/F (Front End Inter/Face) 210 and a BE-I/F (Back End Inter/Face) 220. Examples of the storage device include the memory 240. Examples of the processor include the CPU (Central Processing Unit) 230. Moreover, while the example shown in the drawing represents a configuration in which each controller 22 includes one memory 240, alternatively, a configuration may be adopted in which each controller 22 includes a plurality of memories 240.

For the purpose of ensuring redundancy, the storage control apparatus 21 is provided with two controllers 22 (the controllers #0 and #1). The controllers #0 and #1 are coupled to one another. In order to enhance availability of the storage system 2, a dedicated power supply may be prepared for each controller 22 to supply power to each controller 22 using the dedicated power supply.

The FE-I/F 210 is an interface device for communicating with an external device that exists at a front end of the host computer 1 or the like. The BE-I/F 220 is an interface device that is used by the controller 22 to communicate with the storage device unit 20.

The memory 240 is constituted by a program area 241, a buffer area 242, a management table area 243, and a cache area 244. Moreover, while the memory 240 included in both controllers 22 may be a non-volatile memory or a volatile memory, the cache area that stores dirty data may be made non-volatile by a backup power supply or the like.

The program area 241 stores various control programs such as a read program 50, a write program 51, and a data transfer suspended state recovery program 52.

The buffer area 242 is an area that is used for data transfer that is performed between controllers 22 when read direct transfer and write direct transfer (to be described later) are not performed.

The management table area 243 stores various management tables. The management tables include a buffer area management table 30, a VOL management table 31, a cache directory table 32, a CS area management table 33, a cache allocation management table 34, and a queue header 35. Details of these management tables will be presented later. Moreover, in the present example, the cache area 244 is constituted by a plurality of CS areas.

The cache area 244 is an area that caches read data transmitted from the storage device unit 20 to the host computer 1 and write data transmitted from the host computer 1 to the storage device unit 20.

The CPU 230 realizes various functions by executing the programs stored in the memory 240. Data to be written to the storage device unit 20 and data read from the storage device unit 20 are temporarily stored in the cache area 244.

The storage device unit 20 includes a plurality of PDEVs 200. While a PDEV may be an HDD (Hard Disk Drive), other storage devices (non-volatile storage devices) including an FM (Flash Memory) such as an SSD (Solid State Device) may be used instead. The storage device unit 20 may include PDEVs of different types. In addition, an RG may be constituted by a plurality of PDEVs of a same type. Data is stored in an RG in accordance with a prescribed RAID level. Hereinafter, it is assumed that data stored in an online VOL is eventually stored in an RG.

When the controller 22 receives write data from the host computer 1, a guarantee code is added to the write data received by the FE-I/F 210. The data having been added the guarantee code is stored in an RG. During a read data transfer, the guarantee code added to the read data is checked by the CPU 230. A guarantee code may be constituted by information indicating a storage position of data (such as a VOL number or an address in a VOL) or information for checking consistency of data (such as a CRC (Cyclic Redundancy Check)).

Figure 3:
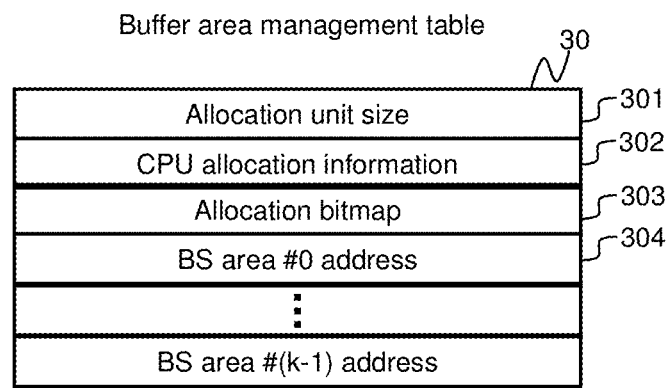
FIG. 3 shows an example of a buffer area management table according to the example.

FIG. 3 shows an example of a buffer area management table according to the example.

The buffer area management table 30 is a table for managing allocation of BS areas. The buffer area management table 30 includes an allocation size 301, CPU allocation information 302, an allocation bitmap 303, and a BS area address 304. The BS area address 304 exists for each BS area.

The allocation size 301 represents a size of a BS area.

The CPU allocation information 302 represents which range of the buffer area 242 (which BS area) is used by which CPU 230. The CPU allocation information 302 may represent a correspondence between an area range in the buffer area 242 (one or more BS area addresses) and the CPU 230. In other words, the CPU 230 to be used may be determined in advance for each BS area. Given that such a correspondence is determined in advance, a reduction in a load associated with allocating a BS area or releasing a BS area on the CPU 230 (a load of contention to the buffer area 242) can be expected. In addition, in the present example, while the allocation of a BS area from a buffer area 242 is normally performed by the CPU 230 in the controller 22 that includes the buffer area 242, the allocation of a BS area from a buffer area 242 in order to store data that is transferred from another controller 22 is performed by a CPU of the other controller 22. In other words, in the present example, the association of the CPU 230 of another controller 22 with a BS area in the CPU allocation information 302 suggests that the BS area is a BS area that is used for data transfer between the controllers 22. Moreover, the present invention is not limited thereto and, for example, the allocation of a BS area from the buffer area 242 may be performed by the CPU 230 in another controller 22 that does not include the buffer area 242. In addition, the allocation of a BS area from the buffer area 242 in order to store data that is transferred from another controller 22 may be performed by the CPU 230 of the controller 22 that includes the buffer area 242.

The allocation bitmap 303 is constituted by a plurality of bits that respectively correspond to a plurality of BS areas. Each bit indicates whether the BS area corresponding to the bit is in use (for example, "1") or in an unused state (for example, "0").

The BS area address 304 represents an address of the BS area in the buffer area 242.

Figure 4:
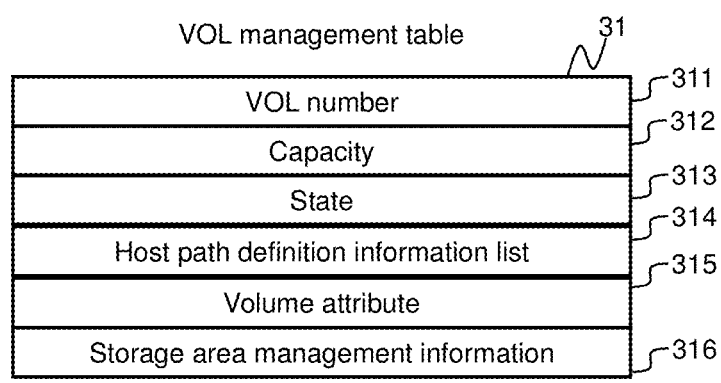
FIG. 4 shows an example of a VOL management table according to the example.

FIG. 4 shows an example of a VOL management table according to the example.

The VOL management table 31 exists for each VOL. The VOL management table 31 includes a VOL number 311, a capacity 312, a state 313, a host path definition information list 314, a VOL attribute 315, and storage area information 316.

The VOL number 311 is an identification number of a VOL. The capacity 312 represents a capacity of a VOL. The state 313 represents a state of a VOL. Examples of the state of a VOL include normal, blocked, and unused.

The host path definition information list 314 represents information for identifying the host computer 1 that is a read/write request source (a name of the host computer 1, port specifying information, and the like) and information for identifying the VOL that is a read/write request destination (port specifying information, a LUN (Logical Unit Number), or the like of the storage system 2).

The VOL attribute 315 represents an attribute of a VOL. Examples of VOL attributes include an online VOL, an RVOL, a TPVOL, an EVOL, and a pool VOL.

The storage area information 316 represents information corresponding to the VOL attribute 315. For example, when the VOL attribute 315 is an RVOL, the storage area information 316 may be information regarding an RG forming a basis of the RVOL (such as a RAID level or a PDEV number). In addition, when the VOL attribute 315 is a TPVOL, the storage area information 316 may be information regarding a pool that is allocated to the TPVOL or a correspondence between a virtual page and a real page.

FIGS. 5 to 8 show a group of tables for managing the cache area 244. The group of tables for managing the cache area 244 includes the cache directory table 32, the CS area management table 33, the cache allocation management table 34, and the queue header 35.

Figure 5:
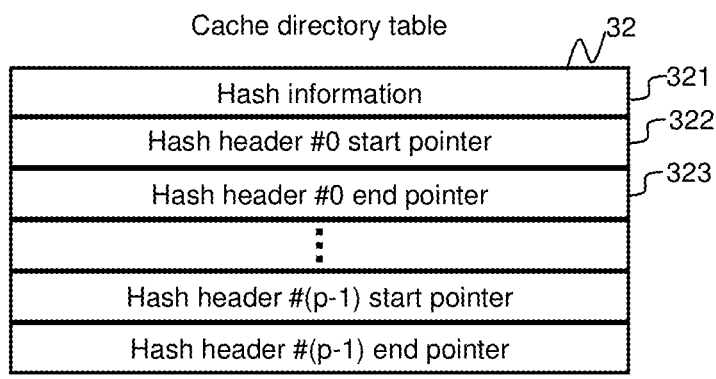
FIG. 5 shows an example of a cache directory table according to the example.

FIG. 5 shows an example of the cache directory table 32 according to the example.

The cache directory table 32 is used by the CPU 24 to retrieve a storage state of data written to a VOL or read from a VOL in the cache area 244. In other words, the cache directory table 32 is an index to the CS area management table 33.

The cache directory table 32 is divided into a plurality of subdirectory entries. In addition, while the cache area 244 is constituted by a plurality of CS areas, one subdirectory entry is associated with one or a plurality of CS areas.

Hash information 321 is information representing a correspondence between a hash value of I/O destination information and a hash header. I/O destination information is information which is included in an I/O request from the host computer 1 and which represents an area in an I/O destination, and typically includes a VOL number and an address in a VOL. Instances of a hash header include a start pointer 322 and an end pointer 323 which represent an address of a CS area management table 33.

In other words, the cache directory table 32 is comparable to an index which manages a correspondence between I/O destination information and a CS area and which is used to retrieve whether or not a CS area has been reserved for an I/O destination. When a CS area management table 33 corresponding to an I/O destination is not found as a result of tracing a start pointer 322 corresponding to a hash value of I/O destination information of the cache directory table 32, this means that a CS area has not been reserved. On the other hand, when a CS area management table 33 corresponding to an I/O destination is found as a result of tracing a start pointer 322 corresponding to a hash value of I/O destination information of the cache directory table 32, this means that a CS area has already been reserved for the I/O destination and that data of an I/O target need only be stored in the reserved CS area.

Moreover, in order to reduce a maximum number of CS area management tables 33 that are coupled to a same hash header and to prevent retrieval time from being increased, a size of the cache directory table 32 may be determined in accordance with a capacity that is supported by the storage system 2.

Figure 6:
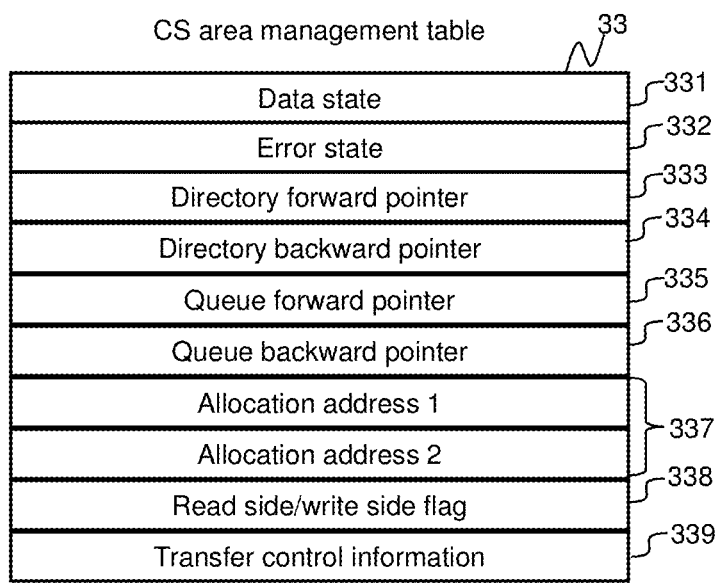
FIG. 6 shows an example of a CS area management table according to the example.

FIG. 6 shows an example of the CS area management table 33 according to the example.

The CS area management table 33 is information which exists for each CS area to manage a storage state of the CS area. The CS area management table 33 includes a data state 331, an error state 332, a directory forward pointer 333, a directory backward pointer 334, a queue forward pointer 335, a queue backward pointer 336, an allocation address 337, a read side/write side flag 338, and transfer control information 339.

The data state 331 represents a state of data in a CS area. Examples of the state of data include free, clean, parity ungenerated dirty, and parity generated dirty. "Free" means that the CS area is a free area. "Clean" represents a state where data stored in the CS area is stored in the storage device unit 20. "Parity ungenerated dirty" represents a state where a parity with respect to data stored in the CS area has not been generated and, at the same time, the data is not stored in the storage device unit 20. "Parity generated dirty" represents a state where a parity with respect to data stored in the CS area has been generated but the data is not stored in the storage device unit 20.

The error state 332 represents whether or not transfer of data during reception of write data is in a suspended state. When the error state 332 represents a data transfer suspended state in the CS area management table 33 in each controller with respect to a CS area corresponding to a certain I/O destination, the state is one of a data transfer suspended state 1 and a data transfer suspended state 2. In other words, the data transfer suspended state 1 and the data transfer suspended state 2 cannot coexist at the same time in the CS area management table 33 in one controller. However, there may be cases where, with respect to a CS area corresponding to a certain I/O destination, the error state 332 is the data transfer suspended state 1 in the CS area management table 33 of one controller and the error state 332 is the data transfer suspended state 2 in the CS area management table 33 of another controller. The "data transfer suspended state 1" represents a state where the transfer of data from the host computer 1 to the storage system 2 has not been completely performed. The "data transfer suspended state 2" represents a state where the transfer of data from one controller to the other controller has not been completely performed. Hereinafter, a data transfer suspended state will be abbreviated as a "suspended state".

The directory forward pointer 333 and the directory backward pointer 334 represent CS area management tables 33 whose corresponding subdirectory entries or hash values are the same. Specifically, the forward pointer 333 corresponds to a CS area management table 33 whose start pointer 322 in a corresponding subdirectory entry or the hash value is the same, and the backward pointer 334 corresponds to a CS area management table 33 whose end pointer 323 in a corresponding subdirectory entry or the hash value is the same (refer to FIG. 10).

The queue forward pointer 335 and the queue backward pointer 336 are information used for coupling to the queue header 35 (any of clean, dirty before parity generation, dirty after parity generation, and free). The queue forward pointer 335 and the queue backward pointer 336 will be described later.

The allocation address 337 is a pointer representing an address of the cache allocation management table 34 that is a coupling destination of the CS area management table 33 that includes the address 337. The allocation address 337 includes an allocation address 1 and an allocation address 2. One of the allocation address 1 and the allocation address 2 corresponds to a write side and the other corresponds to a read side.

The read side/write side flag 338 is information that represents which of the allocation address 1 and the allocation address 2 is a read side (a CS area that stores clean data and parity generated dirty data) and which of the allocation address 1 and the allocation address 2 is a write side (a CS area that stores parity ungenerated dirty data). Specifically, when the flag 338 is raised, a read side corresponds to the allocation address 1, and when the flag 338 is not raised, a write side corresponds to the allocation address 1.

To prepare for generating a new parity with respect to write data that is new data from a current parity and current data, clean data (data already written to the storage device unit) that corresponds to current data and parity generated dirty data (write data (in a dirty state) which has not been written to the storage device unit but for which a parity has been generated) that corresponds to current data are stored in the read side. In this manner, by handing a CS area as a write side or a read side depending on a state (clean or dirty) of data stored in the CS area, the CS area can be effectively utilized.

The transfer control information 339 represents a write range (an address range in the cache area 244) in which data is written and the number of retries of data transfer requests performed by the controller 22 with respect to the host computer 1.

Figure 7:
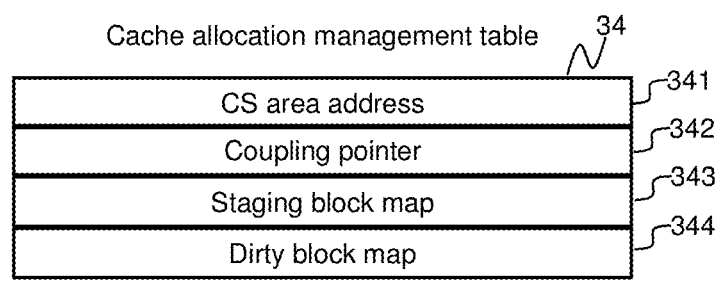
FIG. 7 shows an example of a cache allocation management table according to the example.

FIG. 7 shows an example of the cache allocation management table 34 according to the example.

The cache allocation management table 34 exists for each CS area. The cache allocation management table 34 is information for managing allocation of the cache area 244 (CS area).

The cache allocation management table 34 includes a CS area address 341, a coupling pointer 342, a staging block map 343, and a dirty block map 344. The CS area address 341 represents an address of a CS area. The coupling pointer 342 is a pointer to the CS area management table 33 or to a cache allocation management table 34 when a plurality of cache allocation management tables 34 are allocated to the CS area management table 33. The staging block map 343 includes a plurality of bits respectively corresponding to a plurality of sub-areas that constitute a CS area, and a bit corresponding to an area in which clean data is stored is denoted by ON(1). The dirty block map 344 includes a plurality of bits respectively corresponding to a plurality of sub-areas that constitute a CS area, and a bit corresponding to an area in which dirty data is stored is denoted by ON(1). A different cache allocation management table 34 may be coupled by a coupling pointer to each of a read side and a write side of one CS area management table 33.

Figure 8:
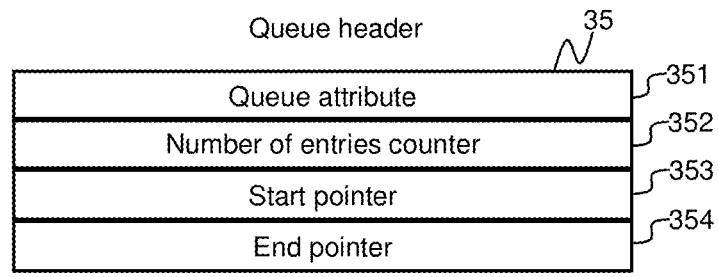
FIG. 8 shows an example of a queue header according to the example.

FIG. 8 shows an example of the queue header 35 according to the example.

The queue header 35 exists for each data state 331 and constitutes a head of a queue of a management table (for example, the CS area management table 33 or the cache allocation management table 34) corresponding to the data state. The queue header 35 includes a queue attribute 351, a number of entries counter 352, a start pointer 353, and an end pointer 354. The queue attribute 351 represents a corresponding data state. The number of entries counter 352 represents the number of coupled management tables. The start pointer 353 represents an address of a management table at the head of a queue. The end pointer 354 represents an address of a management table at the terminal of a queue.

Figure 9:
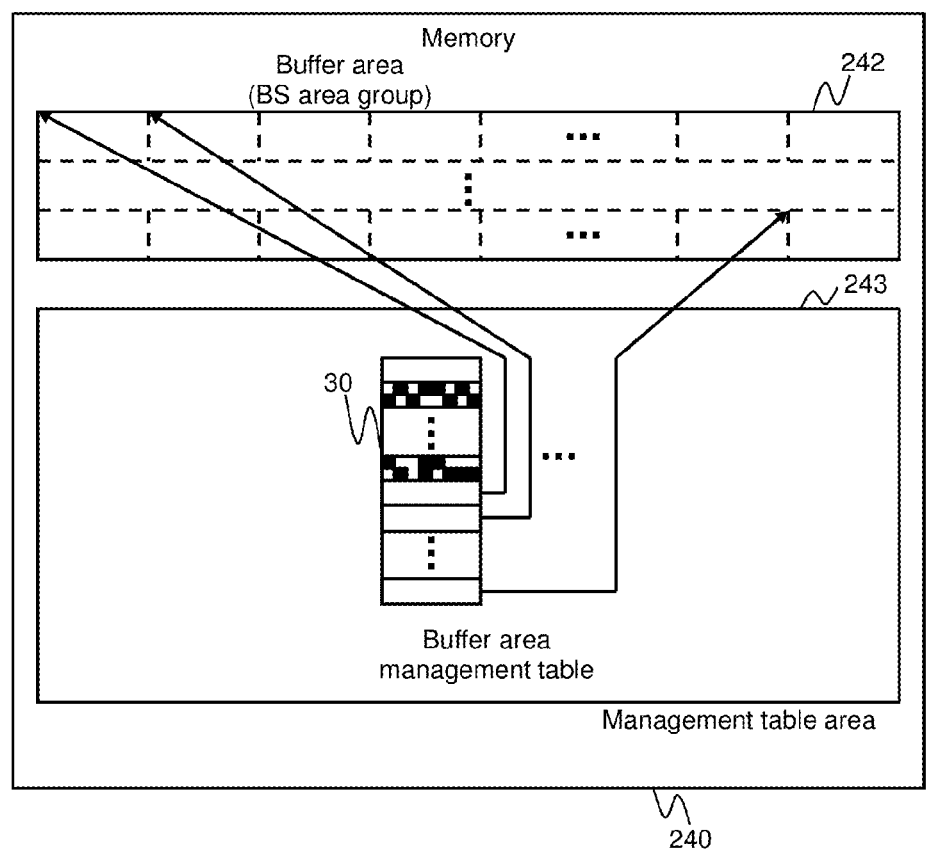
FIG. 9 shows an example of management of a buffer area according to the example.

FIG. 9 shows an example of management of a buffer area according to the example.

A state of each BS area in the buffer area 242 is managed according to the buffer area management table 30. For example, the CPU 230 is capable of identifying a BS area from the BS area address 304, identifying a BS area in an unused state from the allocation bitmap 303, changing a value of a bit corresponding to a BS area in an unused state to ON (1) when the BS area is allocated, and changing a value of a bit corresponding to a used BS area to OFF (0) (releasing the BS area) when data is read from the BS area.

Figure 10:
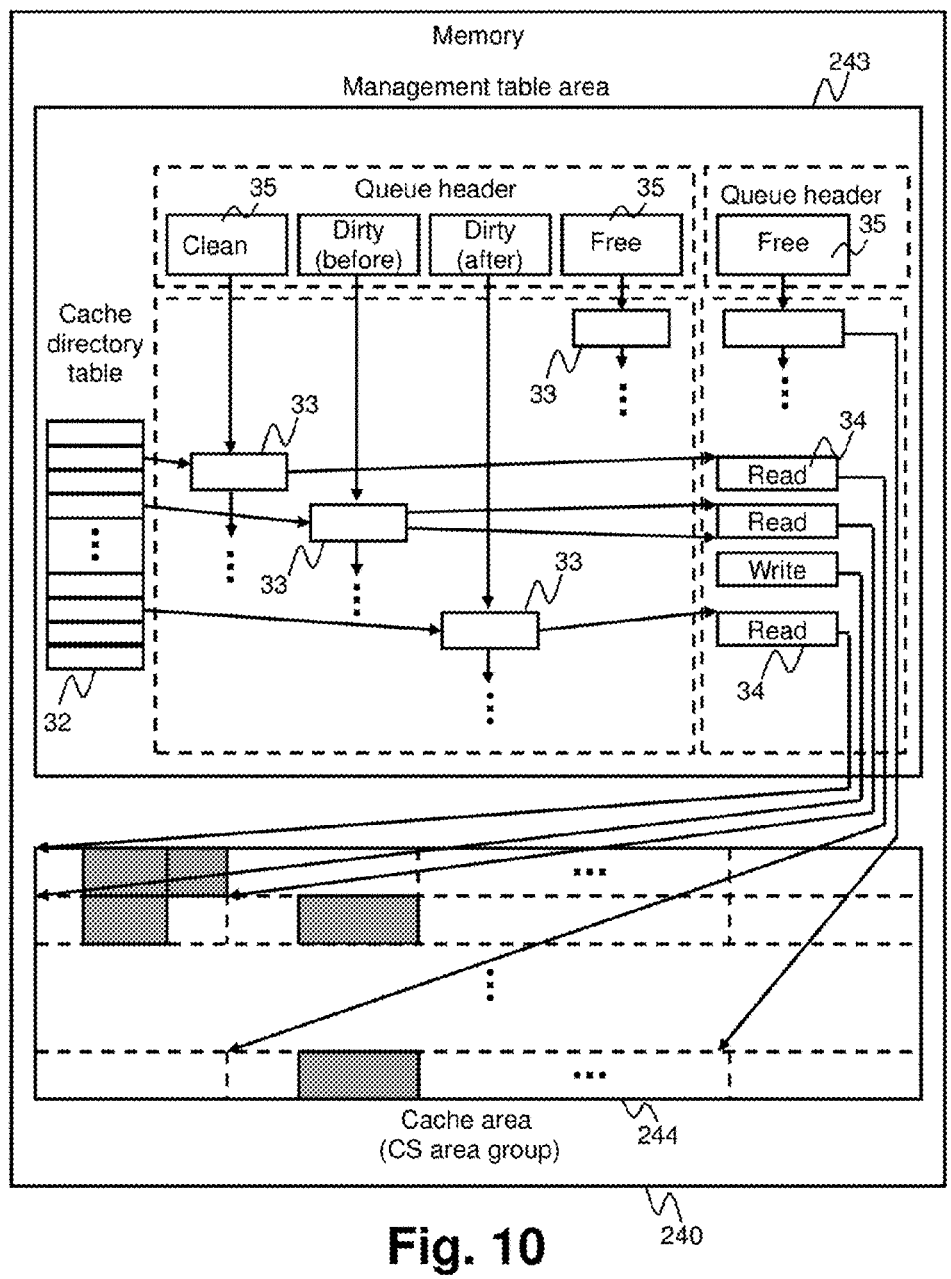
FIG. 10 shows an example of management of a cache area according to the example.

FIG. 10 shows an example of management of the cache area 244 according to the example. Moreover, in FIG. 10, "dirty (before)" represents dirty before parity generation and "dirty (after)" represents dirty after parity generation.

The CS area management table 33 is coupled to a subdirectory entry in the cache directory table 32. As described earlier, one subdirectory entry corresponds to a hash value of I/O destination information.

In addition, the queue header 35 exists for each CS area management table 33 and each cache allocation management table 34. Furthermore, in particular, with respect to the CS area management table 33, there exist a plurality of queue headers 35 respectively corresponding to a plurality of data states. Hereinafter, a queue of a management table that is coupled to a queue header corresponding to a data state "AA" (for example, free) may be referred to as an "AA queue" (for example, a free queue). The CS area management table 33 is directly or indirectly coupled to the queue header 35 corresponding to a data state represented by the management table 33. An indirect coupling is, for example, a coupling separated by one or more other CS area management tables 33. As described earlier, there are two types of queue pointers: the queue forward pointer 335 and the queue backward pointer 336. The reason that two pointers are provided as described above is to realize LRU (Least Recently Used) control of data stored in the CS area management table 33 or, in other words, to realize control in which data with a longer lapsed time from access is preferentially discarded from the cache. Specifically, for example, when a the CS area management table 33 corresponding to a certain queue header 35 (a target CS area management table 33) is migrated to a head position, extraction must be performed from the middle of the target CS area management table 33. In addition, in order to maintain a coupled state of the queue during an operation of extraction from the middle of the target CS area management table 33, a CS area management table specified by a forward pointer of the target CS area management table 33 and a CS area management table specified by a backward pointer of the target CS area management table 33 must be coupled to one another.

The CS area management table 33 is coupled to the cache allocation management table 34 via at least one of the allocation addresses 1 and 2. Moreover, the cache allocation management table 34 may sometimes be allocated to each of the allocation addresses 1 and 2 in the CS area management table 33. For example, there may be cases where a write occurs with respect to a read side storing data in a clean state in correspondence with the CS area management table 33 and a write side is reserved with respect to the read side. In such a case, a write side must be allocated to one CS area management table 33 in addition to a read side, in which case both the allocation management table addresses 1 and 2 in one CS area management table 33 are used.

While clean data is stored only in one of the controllers 22, parity ungenerated dirty data and parity generated dirty data are duplexed in a cache area of one controller and a cache area of the other controller. Alternatively, the cache area 244 may include a volatile area and a non-volatile area, whereby clean data may be stored in the volatile area and dirty data may be stored in the non-volatile area.

When receiving a read or write request from the host computer 1, the CPU 230 determines whether or not a CS area management table 33 corresponding to an I/O destination exists as a result of tracing the start pointer 322 of the cache directory table 32 corresponding to a hash value of I/O destination information included in the request. A determination result of false means that a CS area has not been reserved for the I/O destination. When a CS area has not been reserved, the CPU 230 reserves a CS area. Specifically, the CPU 230 acquires one CS area management table 33 from a free queue (a CS area management table group) and couples the acquired management table 33 to a subdirectory entry and, at the same time, acquires one or a plurality of cache allocation management tables 34 from a free queue (a cache allocation management table group) and couples the management tables 34 to the acquired CS area management table 33.

When a received request is a read request, the CPU 230 reserves a CS area as a read side, stages data to the read side from an RG that is a read source according to the I/O destination information, changes the data state 331 from free to clean, and couples the corresponding CS area management table 33 to a clean queue (for example, directly couples the corresponding CS area management table 33 to a clean queue header 35).

When a received request is a write request, the CPU 230 reserves a CS area as a write side, stores write data in the write side, changes the data state 331 from free to parity ungenerated dirty, and couples the corresponding CS area management table 33 to the queue header 35 of a parity ungenerated dirty.

When parity generation is executed in the storage system 2 asynchronously with the request from the host computer 1, the CPU 230 integrates dirty data of the write side to the read side and discards the data of the write side, changes the data state 331 to parity generated dirty, and couples the corresponding CS area management table 33 to a parity generated dirty queue.

Data in a CS area corresponding to the CS area management table 33 coupled to the parity generated dirty queue is destaged to an RG of a write destination asynchronously with the request from the host computer 1. Moreover, upon an access from the host computer 1, a CS area management table 33 corresponding to the access may make a transition to a head in a queue of a same attribute. This is because the management table 33 is a management table 33 corresponding to a recently accessed CS area.

FIGS. 11 to 14 show outlines of data transfer modes of the FE-I/F 210. Modes of data transfer between the host computer 1 and the cache area 244 include two-stage transfers and direct transfers. Two-stage transfers are transfer modes in which data is transferred via the buffer area 242 (BS area). Direct transfers are transfer modes in which data is transferred without involving the buffer area 242 (BS area).

Two-stage transfers include a write two-stage transfer and a read two-stage transfer. The write two-stage transfer is a two-stage transfer in which write data from the host computer 1 is transferred to the cache area 244 (CS area) via the buffer area 242 (BS area). The read two-stage transfer is a two-stage transfer in which read data in the cache memory 244 is transferred to the host computer 1 via the buffer area 242 (BS area). Meanwhile, direct transfers include a write direct transfer and a read direct transfer. The write direct transfer is a direct transfer in which write data from the host computer 1 is transferred to the cache area 244 (CS area) without involving the buffer area 242 (BS area). The read direct transfer is a direct transfer in which read data in the cache area 244 (CS area) is transferred to the host computer 1 without involving the buffer area 242 (BS area).

Figure 11:
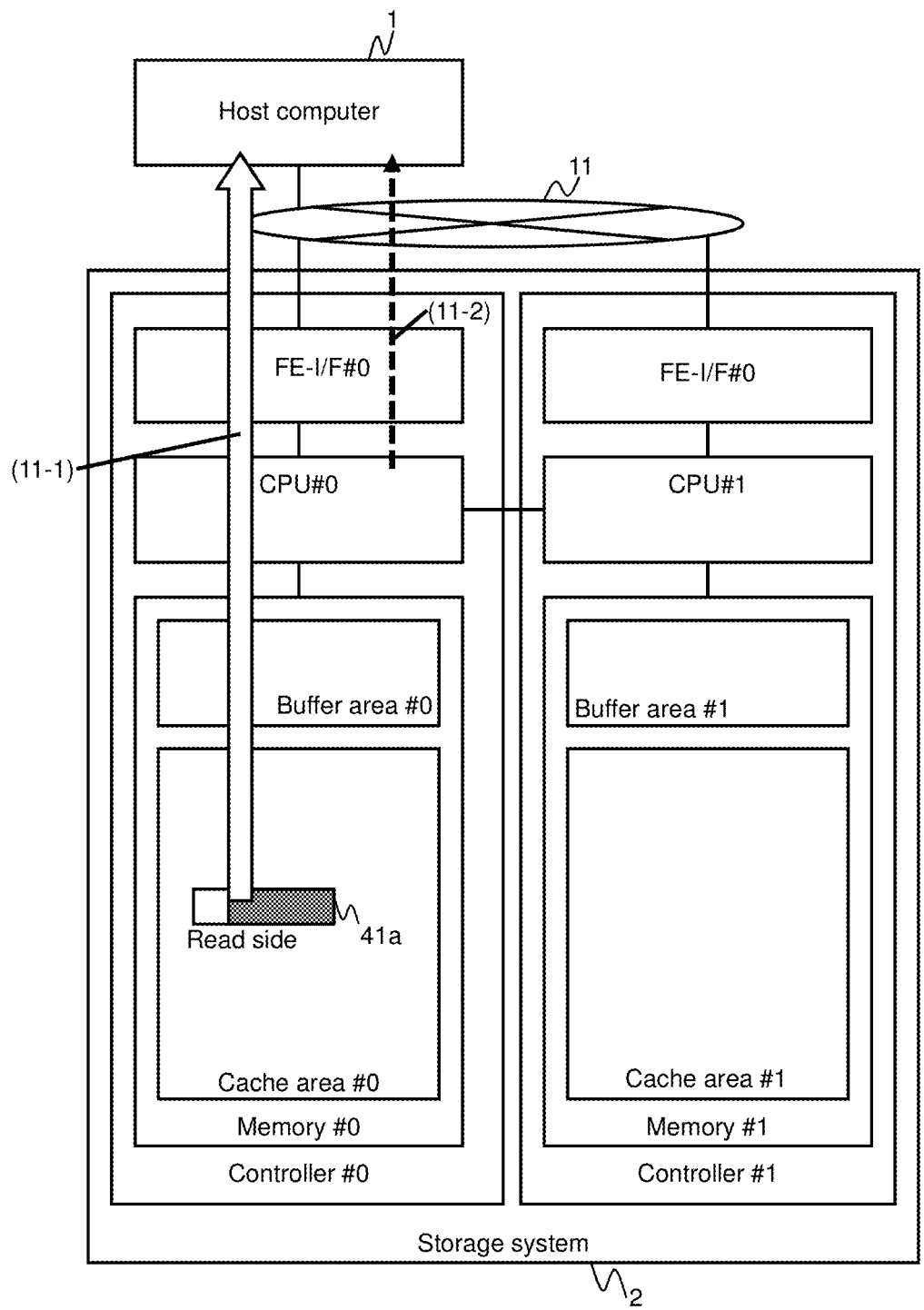
FIG. 11 shows an example of a read direct transfer according to the example.
Figure 12:
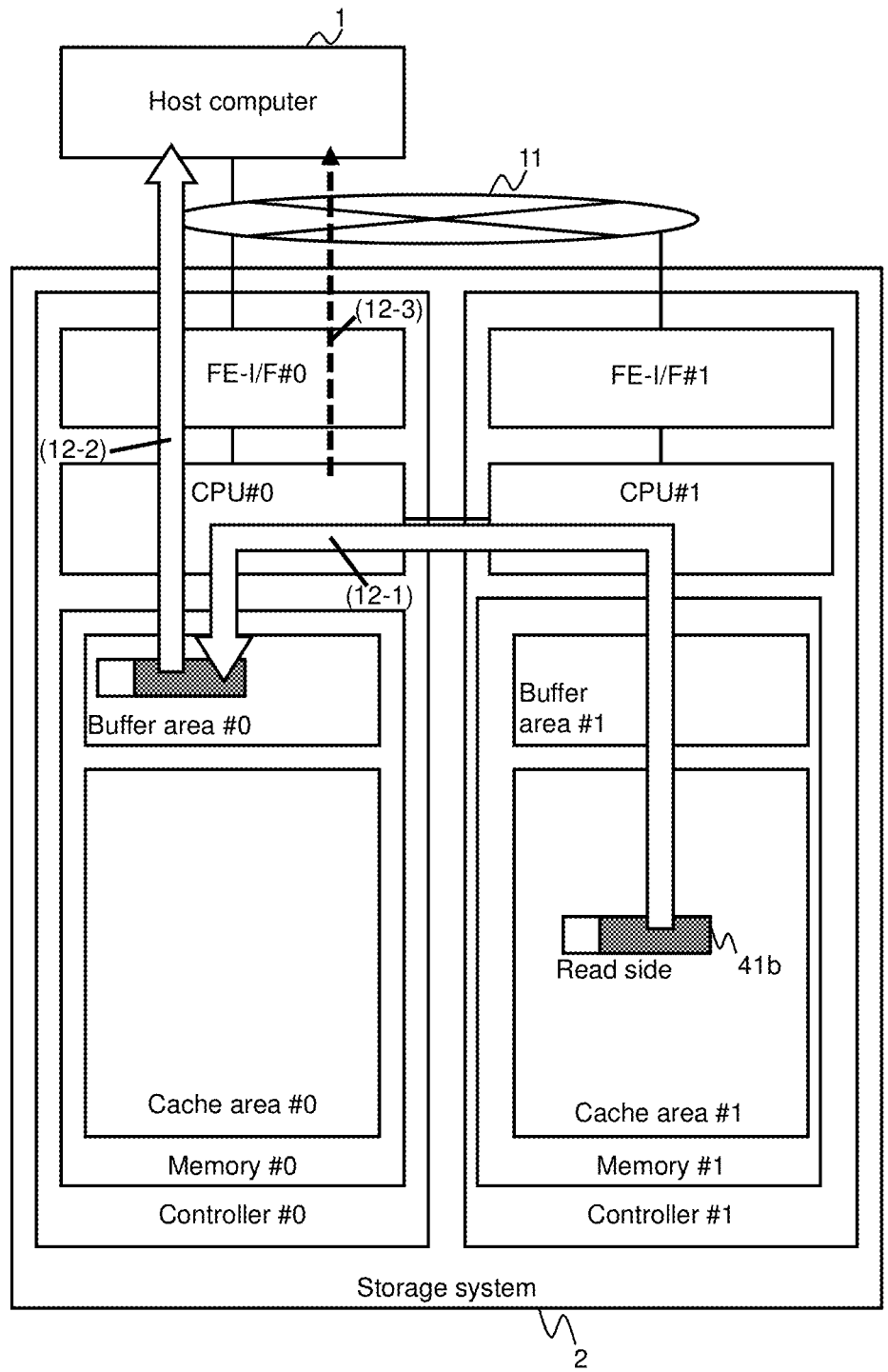
FIG. 12 shows an example of a read two-stage transfer according to the example.

FIG. 11 shows an example of read direct transfer. FIG. 12 shows an example of read two-stage transfer.

As shown in FIG. 11, a read direct transfer from the FE-I/F #0 having received a read request can be performed when read data exists in the cache area #0. In a read direct transfer, read data stored in the cache area #0 is transferred by the FE-I/F #0 of the controller #0 to the host computer 1. More specifically, the FE-I/F #0 checks a guarantee code attached to the read data, and if a bit error has not occurred in the read data, the CPU #0 transfers the read data to the host computer 1 via the FE-I/F #0 (for example, while checking the guarantee code attached to the read data) (11-1). Subsequently, the CPU #0 transmits a read request completion report to the host computer 1 via the FE-I/F #0 (11-2). Moreover, the guarantee code can be checked by the CPU #0 instead of the FE-I/F #0.

On the other hand, as shown in FIG. 12, when the FE-I/F #0 has received a read request but read data is stored in the cache area #1, a read two-stage transfer is performed. In a read two-stage transfer, the CPU #0 reserves a BS area from the buffer area #0. Hereinafter, a BS area reserved from the buffer area #1 is referred to as a "BS area #1" and a BS area reserved from the buffer area #0 is referred to as a "BS area #0". Read data of the read side 41b in the cache area #1 is transferred to the reserved BS area #0. While the transfer is a write by the CPU #1 from the read side 41b to the BS area #0, the transfer may be a read by the CPU #0 from the read side 41b to the BS area #0. After the CPU #0 stores the read data in the BS area #0 (12-1), the FE-I/F #0 checks the guarantee code attached to the stored read data, and the CPU #0 transfers the read data from the BS area #0 to the host computer 1 via the FE-I/F #0 (for example, while checking the guarantee code attached to the read data) (12-2). Subsequently, the CPU #0 transmits a read request completion report to the host computer 1 (11-3).

Although not shown, when data of the write side exists (in other words, when the host computer 1 transmits a read request after transmitting a write request), the read data is data of the write side that is supplemented by data of the read side. When read data is transferred from a read side and a write side existing in different controllers 22, a two-stage transfer is performed.

Figure 13:
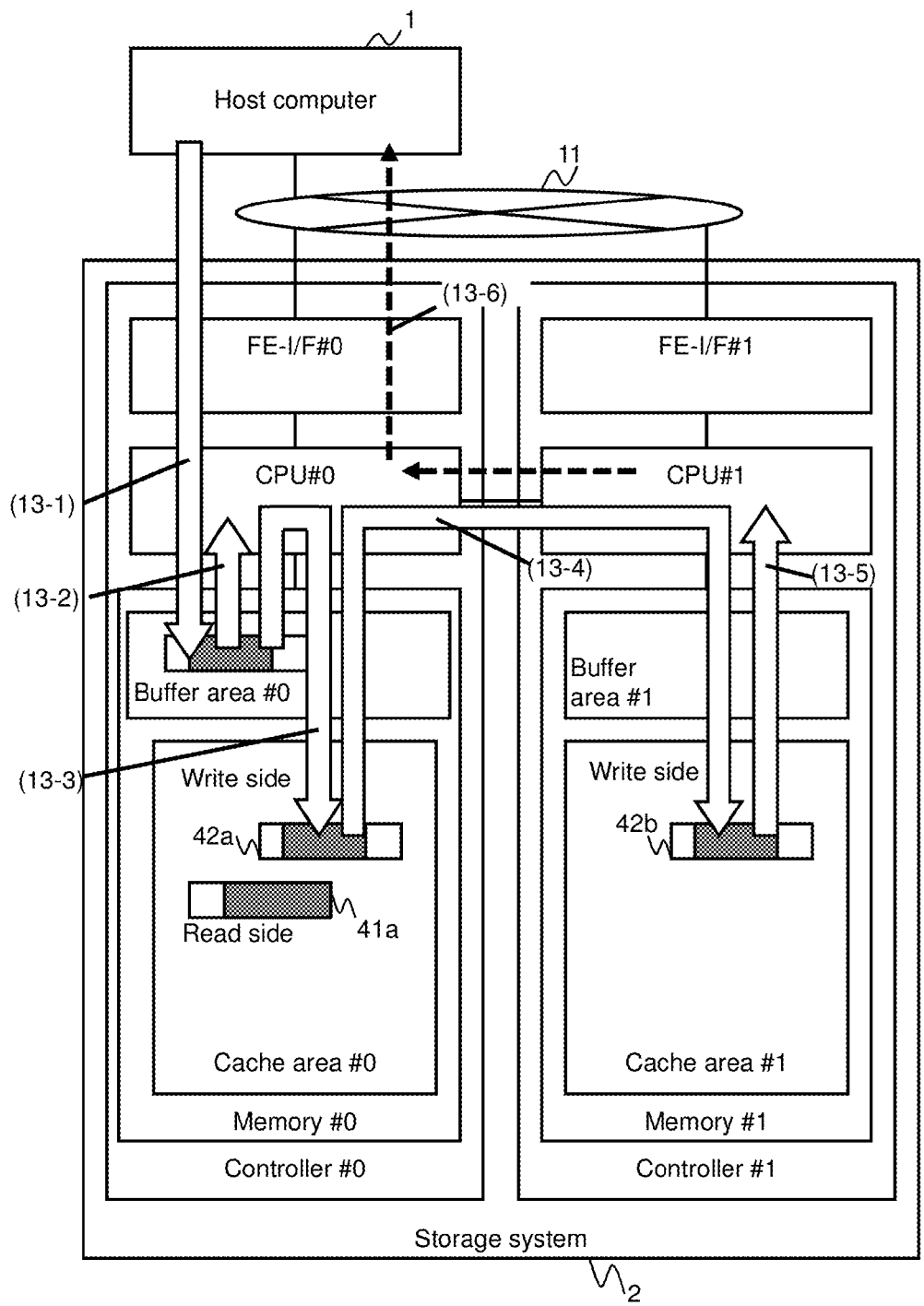
FIG. 13 shows an example of a write two-stage transfer according to the example.
Figure 14:
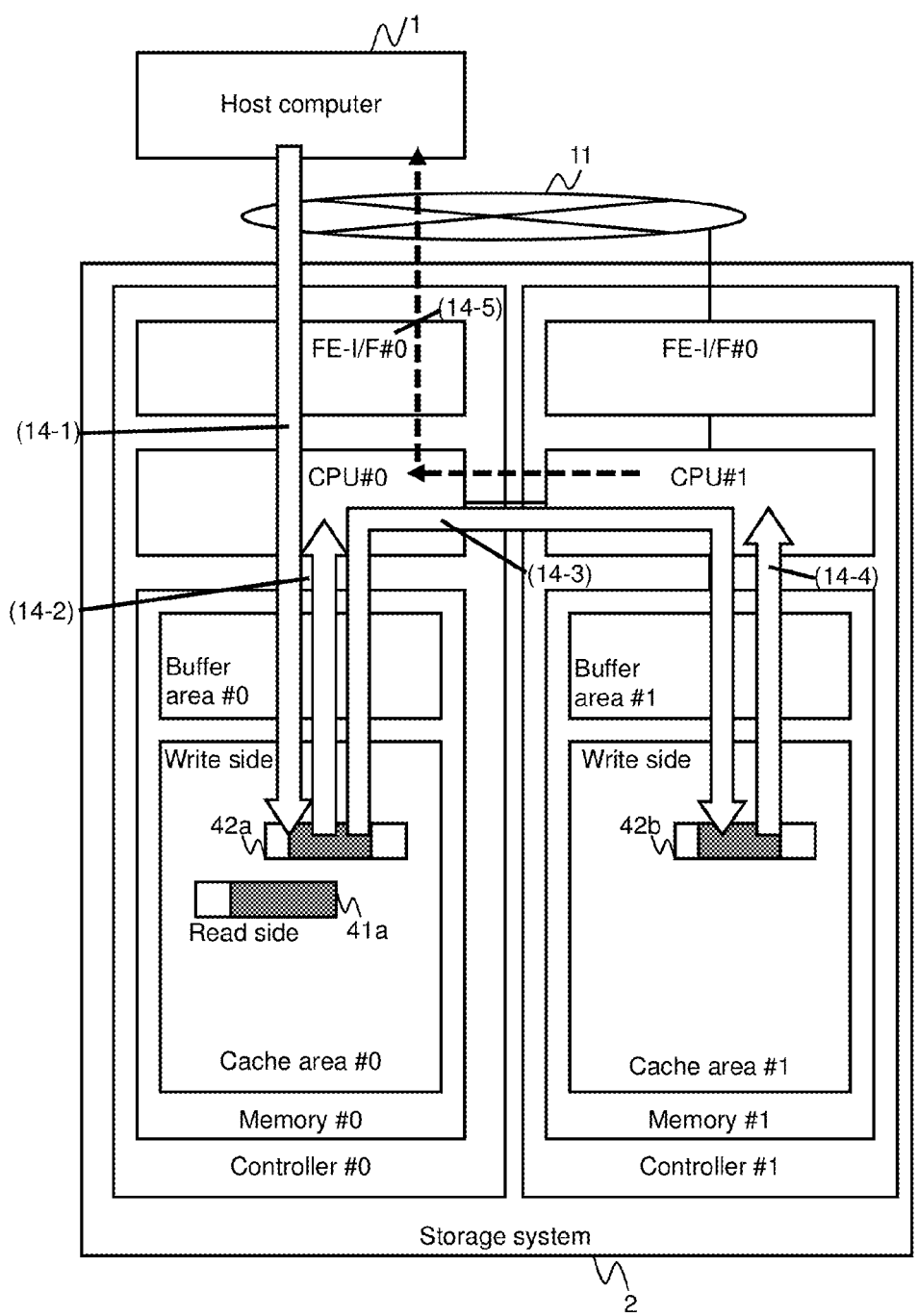
FIG. 14 shows an example of a write direct transfer according to the example.

FIG. 13 shows an example of a write two-stage transfer and FIG. 14 shows an example of a write direct transfer.

In order to avoid destruction of parity ungenerated dirty data of the write side due to a suspension of write data transfer, generally, a write is always executed by a two-stage transfer. In addition, although not shown, even when write data is copied according to an internal function (local copy, remote copy, or the like) of the storage system 2, a two-stage transfer can be executed.

As shown in FIG. 13, in a write two-stage transfer, the FE-I/F #0 adds a guarantee code to write data from the host computer 1 and stores the write data to which the guarantee code has been added in the BS area #0 (a BS area reserved from the buffer area #0 for the two-stage transfer) (13-1). When parity ungenerated dirty data is stored in the write side 42a of the cache area #0, the CPU #0 verifies the guarantee code (13-2). Moreover, in the event that the write side 42a and the write side 42b are newly allocated during a reception of a write request, when parity ungenerated dirty data is not stored, the verification of the guarantee code of (13-2) is omitted.

When a bit error has not occurred, the CPU #0 copies write data from the BS area #0 to the write side 42a of the cache area #0 (13-3) and further copies the write data to the write side 42b of the cache area #1 (13-4). The CPU #1 verifies the guarantee code of the write data stored in the write side 42b (13-5). If a bit error has not occurred, the CPU #1 reports write request completion to the host computer 1 via the CPU #0 and the FE-I/F #0 (13-6).

On the other hand, as shown in FIG. 14, in a write direct transfer, the FE-I/F #0 adds a guarantee code to write data from the host computer 1 and stores the write data to which a guarantee code has been added in the write side 42a of the cache area #0 (14-1). When parity ungenerated dirty data is stored in the write side 42a, the CPU #0 verifies the guarantee code (14-2). Moreover, in a similar manner to a write two-stage transfer, in the event that the write side 42a and the write side 42b are newly allocated during a reception of a write request, when parity ungenerated dirty data is not stored, the verification of the guarantee code of (14-2) is omitted.

If a bit error has not occurred, the CPU #0 copies the write data from the write side 42a of the cache area #0 to the write side 42b of the cache area #1 (14-3). The CPU #1 verifies the guarantee code of the write data stored in the write side 42b (14-4). If a bit error has not occurred, the CPU #1 reports write request completion to the host computer 1 via the FE-I/F #1 (14-5).

FIG. 15 shows an example of a comparison of characteristics of write transfer procedures according to the example. Data states are as follows. A case where a state of the cache area 244 during reception of a write request is no cache data or (cache data exists AND (the data state is clean OR parity generated dirty)) is referred to as a case X. In addition, a case where cache data exists AND the data state is parity ungenerated dirty is referred to as a case Y.

Transfer modes may be roughly divided into two-stage transfers (with/without guarantee code verification) and direct transfers (with/without guarantee code verification).

As for methods of data recovery upon a failure during a write, in the case X, write data is discarded in both procedures, while in the case Y, a transfer retry of the write data is performed in a two-state transfer and a transfer retry of the write data or recovery using dirty data of another controller is performed in a direct transfer. Moreover, the parentheses ((1-1) to (1-6)) described in the methods of data recovery upon a failure during a write respectively correspond to (13-1) to (13-6) in FIG. 13. The parentheses ((1-1) to (1-5)) also respectively correspond to (14-1) to (14-5) in FIG. 14.

Compared to "only two-stage transfer during write", "only direct transfer during write" is capable of reducing the number of memory accesses during a write. In addition, a mode is also conceivable in which a "write two-stage transfer" is only performed when there is parity ungenerated dirty in the write side. While the effect of reducing the number of memory accesses is diminished, data recovery upon suspension of a write data transfer can be readily implemented.

In the following description, a mode in which execution of a write two-stage transfer is partially enabled in "only direct transfer during write" will be mainly described.

Figure 16:
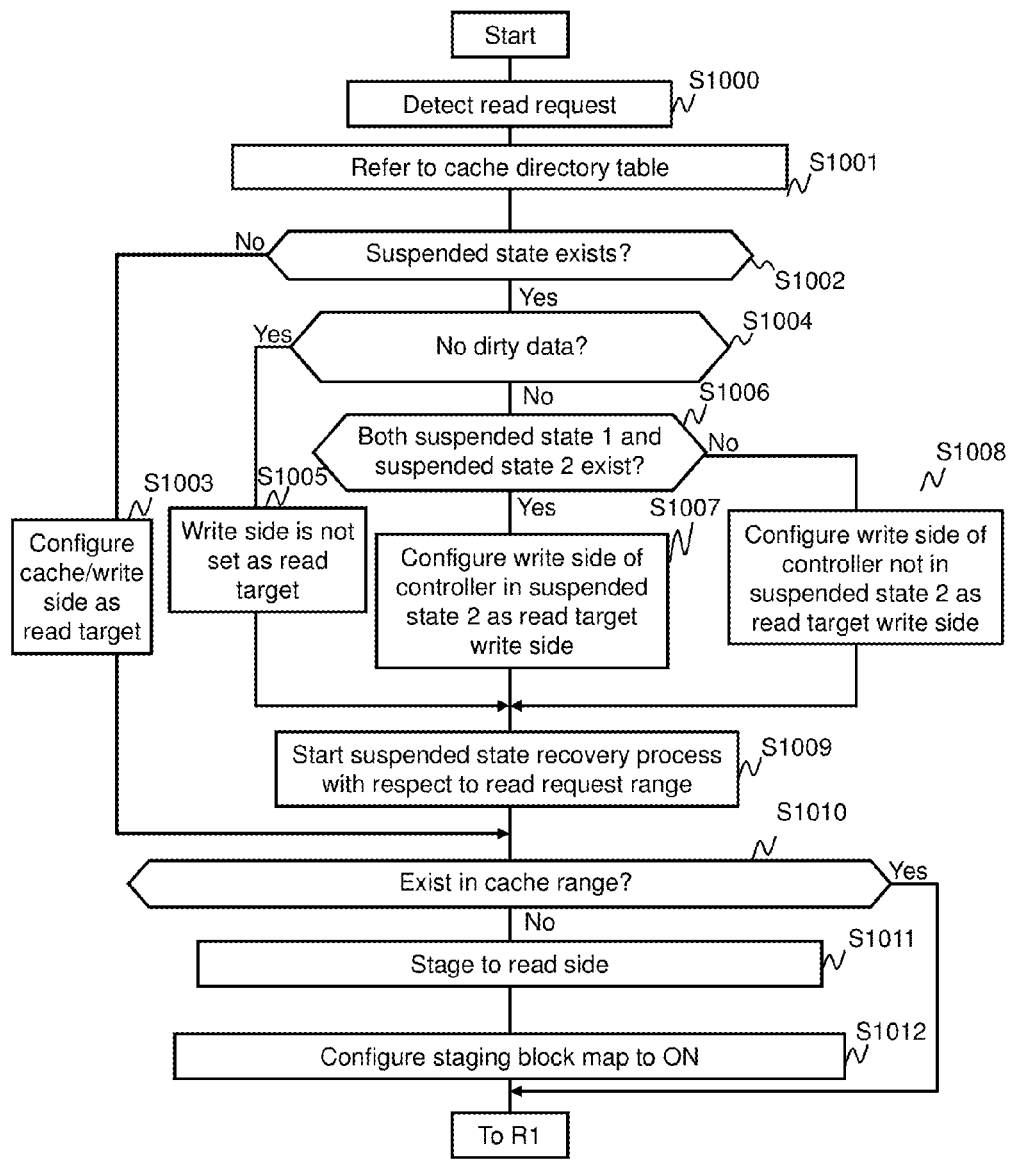
FIG. 16 shows a part of an example of a flow of read processing according to the example.
Figure 17:
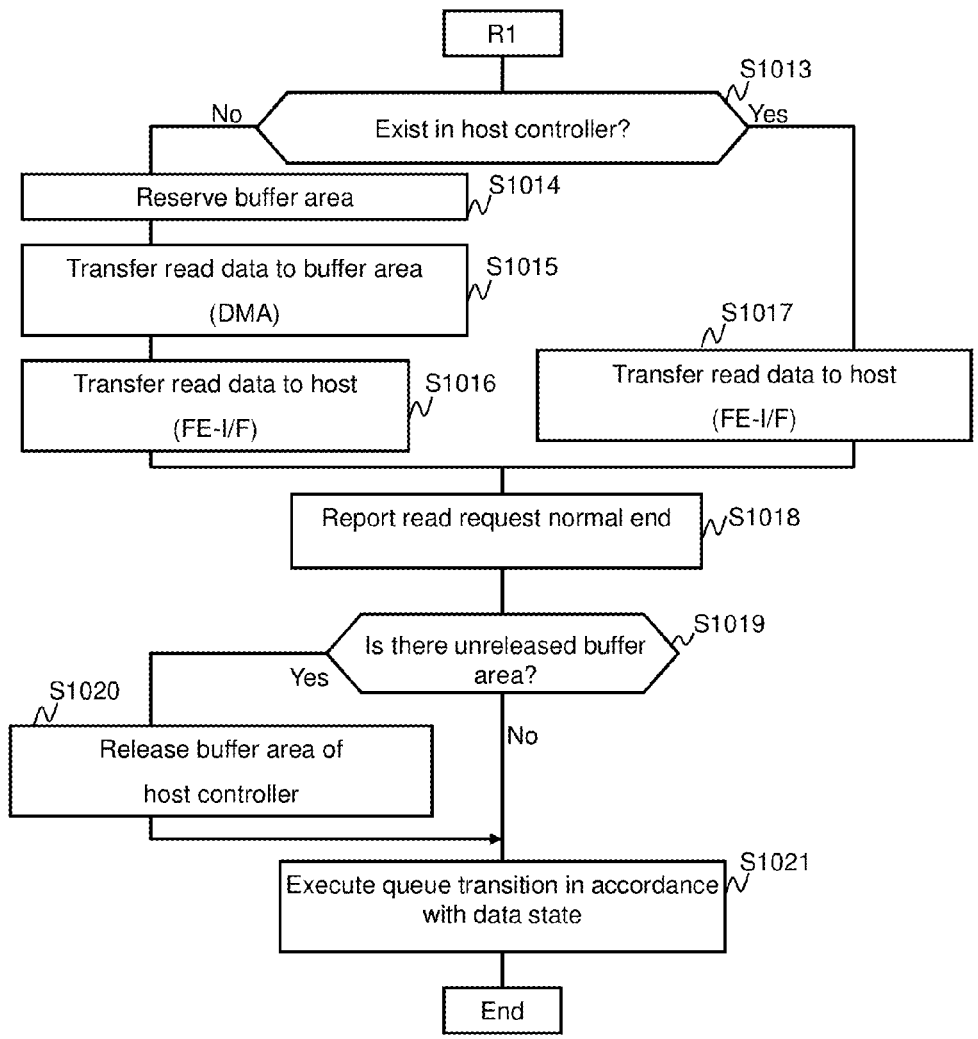
FIG. 17 shows a remainder of the example of a flow of read processing according to the example.

FIGS. 16 and 17 show an example of a flow of read processing according to the example. The read processing is realized by having the CPU 230 execute the read program 50.

First, as shown in FIG. 16, the CPU 230 detects a read request from the FE-I/F 210 (step 1000).

Next, based on read source information (I/O destination information representing a read source) included in the read request, the CPU 230 refers to the CS area management table 33 and the cache allocation management table 34 via the cache directory table 32. This is executed with respect to the cache area management tables 33 of both a host controller and another controller. The CPU 230 refers to the cache area management table 33 of a read request range and verifies a storage state of read request data in the cache area 244 (step 1001).

Next, in order to determine a write side to be read, the CPU 230 determines whether a suspended state exists (step 1002). When data of the write side exists in the read request range, the read target data is data of the write side that is supplemented by data of the read side. Moreover, as described earlier, the suspended state includes suspended states 1 and 2. The suspended state 1 is a state of a CS area included in the controller 22 having received a write request from the host computer 1 when write data in accordance to the write request has not been completely transferred to the controller 22 having received the write request. The suspended state 2 is a state of a CS area included in another controller when write data has not been completely transferred from the controller having received the write data to the other controller.

When neither the data transfer suspended state 1 nor the data transfer suspended state 2 exists (step 1002: No), the CPU 230 configures a read side in which clean data exists as a read target as is normal (step 1003). Subsequently, the processing proceeds to step 1010.

When even only one of the suspended state 1 and the suspended state 2 exists (step 1002: Yes), the CPU 230 verifies whether or not parity ungenerated dirty data exists in a write side of the controller 22 at which the suspended state 2 has occurred (step 1004).

When there is no parity ungenerated dirty data (step 1004: Yes), since the CPU 230 is attempting to store the write data in a newly allocated write side and the write data is to be discarded if the transfer of the write data fails, the CPU 230 does not set the write side as a read target and sets data of the read side (and data to be staged in step 1011) as a read target (step 1005). Subsequently, the processing proceeds to step 1009.

When there is parity ungenerated dirty data (step 1004: No), the CPU 230 determines whether both the suspended state 1 and the suspended state 2 exist when observing CS area management tables 33 that correspond to read sources of both the host controller and the other controller (step 1006).

When both the suspended state 1 and the suspended state 2 exist (step 1006: Yes), since a failure state exists which had occurred during a transfer of write data from the host computer 1 to the cache area 244 of the controller 22 having received the write request, the CPU 230 sets a write side of the controller 22 to which the suspended state 2 is configured (the controller 22 in which parity ungenerated dirty data is stored) as a read target (step 1007). Subsequently, the processing proceeds to step 1009.

When only one of the suspended state 1 and the suspended state 2 exists (in other words, when the suspended state 2 exists in one of the controllers) (step 1006: No), since a failure state exists which had occurred during copying of write data from the write side of the controller 22 having received the write request to the write side of the other controller 22, the CPU 230 sets a write side of the controller 22 to which the suspended state 2 is not configured (the controller 22 having received the write request) as a read target (step 1008).

Next, the CPU 230 starts a suspended state recovery process with respect to a read request range (step 1009). The suspended state recovery process is started without awaiting an end thereof.

Next, the CPU 230 determines whether or not all data in the read request range exists in the cache area 244 (step 1010).

When all data in the read request range exists in the cache area 244 (step 1010: Yes), processing proceeds to step 1013 in FIG. 17.

When all data in the read request range does not exist in the cache area 244 (step 1010: No), the CPU 230 stages data not stored in the cache area 244 to a read side from an RG (step 1011). In order to show that effective clean data is stored in the read side, the CPU 230 configures bits corresponding to a staging range in a staging block map to ON (step 1012). Subsequently, the processing proceeds to step 1013 in FIG. 17.

As shown in FIG. 17, the CPU 230 determines whether or not all data in the read request range is in the host controller (step 1013). Both the write side and the read side storing data in the read request range must be present at the host controller.

When data of a part of the read request range is not in the host controller (step 1013: No), the CPU 230 reserves a BS area of the host controller in order to execute a read two-stage transfer (step 1014). The CPU 230 copies read data (by DMA or the like) to the reserved BS area from the read side and the write side (determined in steps 1002 to 1008) (step 1015). The CPU 230 transfers the read data from the reserved BS area to the host computer 1 via the FE-I/F 210 (step 1016). Subsequently, the processing proceeds to step 1018.

When all data in the read request range is in the host controller (step 1013: Yes), in order to execute a read direct transfer, the CPU 230 transfers the read data from the read side of the host controller 22 to the host computer 1 via the FE-I/F 210 (step 1017).

Next, the CPU 230 reports a normal end of the read request to the host computer 1 (step 1018).

Next, the CPU 230 determines the presence or absence of unreleased BS areas (step 1019). When executing a read two-stage transfer, since the BS area reserved in step 1014 remains in the host controller in an unreleased state, the CPU 230 releases the reserved BS area (step 1020).

Finally, the CPU 230 executes a queue transition in accordance with the data state (step 1021). The CPU 230 executes coupling to a head of a clean queue when the CS area management table 33 has been newly reserved from a free queue, executes recoupling to a head of a queue of a same data state when the CS area management table 33 had existed at the time of a read request, and the like.

This concludes the description of the read processing.

Figure 18:
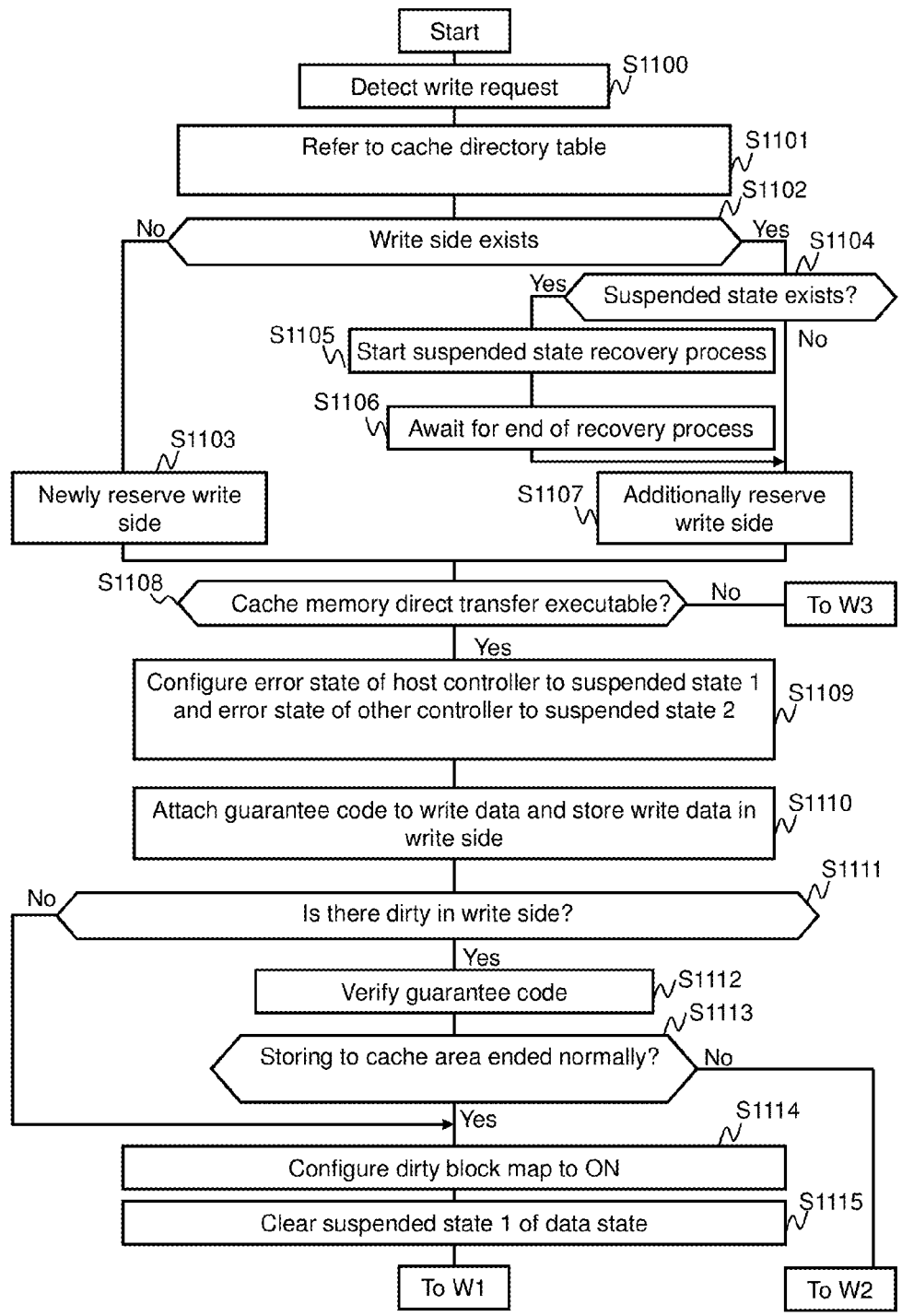
FIG. 18 shows a part of an example of a flow of write processing according to the example.
Figure 19:
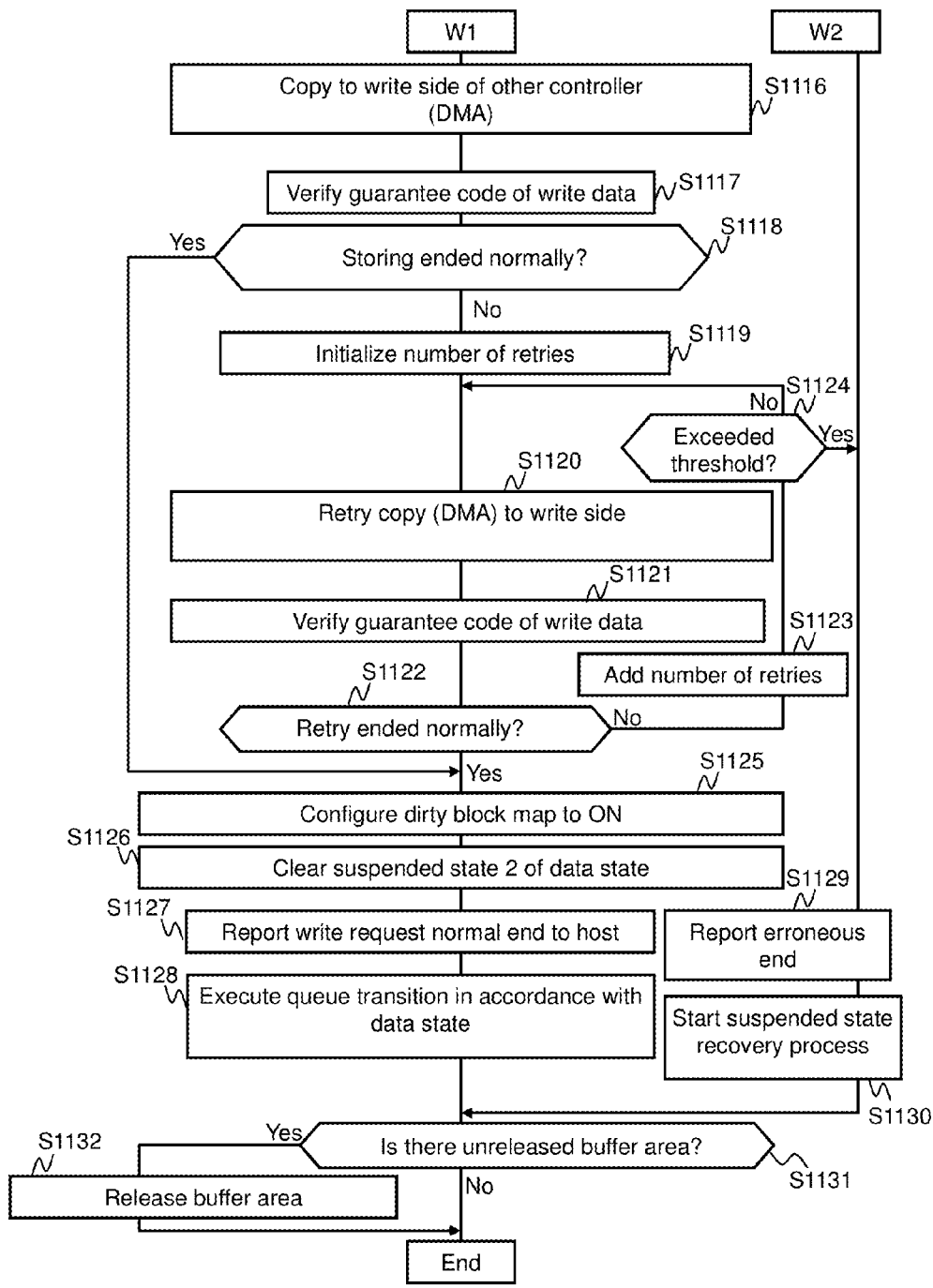
FIG. 19 shows another part of the example of a flow of write processing according to the example.
Figure 20:
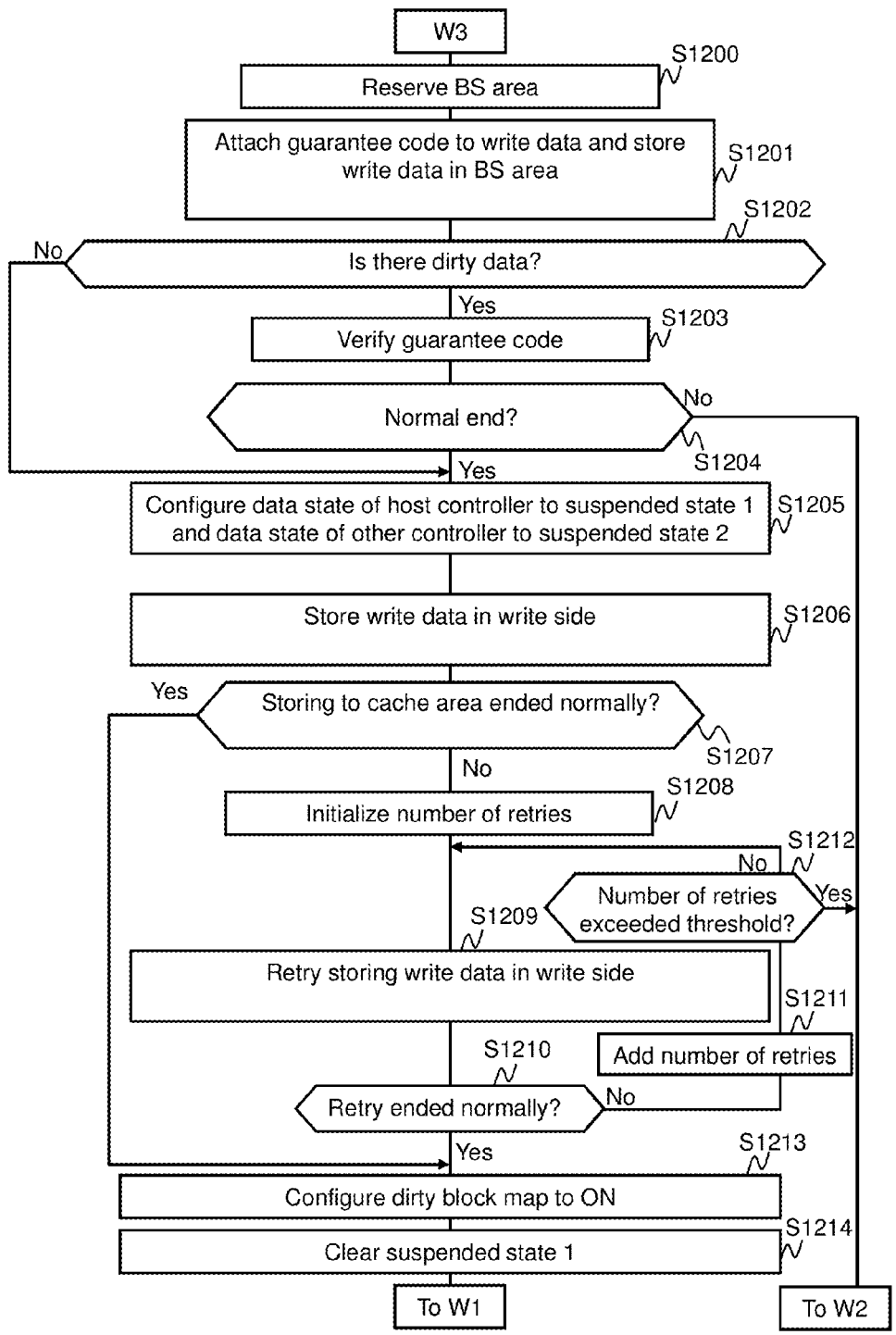
FIG. 20 shows a remainder of the example of a flow of write processing according to the example.

FIGS. 18, 19, and 20 show an example of a flow of write processing according to the example. The write processing is realized by having the CPU 230 execute the write program 51.

First, as shown in FIG. 18, the CPU 230 detects a write request from the FE-I/F 210 (step 1100).

Next, based on write destination information (a VOL number and an address in the VOL) included in the write request, the CPU 230 refers to the CS area management table 33 and the cache allocation management table 34 via the cache directory table 32. This is executed with respect to the CS area management tables 33 of both a host controller and another controller. The CPU 230 refers to the cache area management table 33 of a write request range and verifies a storage state of data in a write range in the cache area 244 (step 1101). Moreover, there may be cases where the CS area management table 33 is not yet reserved with respect to write destination information.

Next, the CPU 230 determines whether a write side has already been reserved (step 1102). This is executed with respect to the CS area management tables 33 of both the host controller and the other controller. Normally, write sides are reserved in both CS area management tables 33 or in neither CS area management table 33.

When a write side has not yet been reserved (step 1102: No), the CPU 230 newly reserves a write side (step 1103). This is executed with respect to the CS area management tables 33 of both the host controller and the other controller.

When a write side has already been reserved (step 1102: Yes), the CPU 230 determines whether a suspended state exists in the write request range (step 1104).

When a suspended state does not exist in the write request range (step 1104: No), the processing proceeds to step 1107.

When a suspended state exists in the write request range (step 1104: Yes), the CPU 230 starts a suspended state recovery process with respect to the write request range according to a starting factor of write synchronization (step 1105). Subsequently, the CPU 230 waits for the suspended state recovery process to end (step 1106).

Next, the CPU 230 additionally reserves a write side that is insufficient to store the write data in the write request range (step 1107). When the write data in the write request range can be stored using only a write side that has already been reserved, the CPU 230 does nothing.

Next, the CPU 230 determines whether a cache memory direct transfer can be executed (step 1108). Although a write direct transfer can normally be executed (step 1108: Yes), in a case where the internal function described earlier of the storage system 2 is applied to the volume or the like, a write two-stage transfer must sometimes be performed (step 1108: No). In such a case, the processing proceeds to step 1200 in FIG. 20.

Next, the CPU 230 configures an error state of the host controller 22 having received the write request to the suspended state 1 and configures an error state of the other controller to the suspended state 2 (step 1109).

Next, the FE-I/F 210 stores the write data in the write side of the cache area 244 of the host controller from the host computer 1 while adding a guarantee code to the write data (step 1110).

Next, the CPU 230 determines whether there is dirty data (for example, parity ungenerated dirty data) whose write destination is a same area as a write destination area (an area in a VOL) of the write data in the write side of the host controller (step 1111).

When there is no parity ungenerated dirty data (step 1111: No), since the CPU 230 is attempting to store the write data in a newly allocated write side and the write data is to be discarded if the transfer of the write data fails, the CPU 230 skips verification of a data guarantee code at the controller 22 having received the write request. Subsequently, the processing proceeds to step 1114.

When there is parity ungenerated dirty data in the write side of the host controller (step 1111: Yes), the CPU 230 verifies the guarantee code of the write data (step 1112).

Next, the CPU 230 determines whether the storing of the write data in the cache area of the host controller has normally ended (step 1113). This determination is made based on a data transfer execution result of the FE-I/F 210, a data guarantee code verification result, or the like.

When storing has not ended normally (step 1113: No), processing proceeds to step 1129 in FIG. 19.

When storing has ended normally (step 1113: Yes), in order to show that effective dirty data is stored in the write side, the CPU 230 configures bits corresponding to an area in which the dirty data is stored in a dirty block map corresponding to the write side of the host controller in the write request range to ON (step 1114).

Next, the CPU 230 clears (cancels) the suspended state 1 of the error state of the host controller 22 having received the write request (step 1115). Subsequently, the processing proceeds to step 1116 in FIG. 19.

As shown in FIG. 19, the CPU 230 copies (by DMA or the like) the write data from the write side of the host controller to the write side of the other controller (step 1116).

Next, the CPU 230 verifies the guarantee code of the write data (step 1117).

Next, the CPU 230 determines whether the storing of the write data in the cache area 244 of the other controller has normally ended (step 1118). This determination is made based on a result of copy execution in step 1116, a data guarantee code verification result, or the like.

When storing has ended normally (step 1118: Yes), processing proceeds to step 1125.

When storing has not ended normally (step 1118: No), since a data transfer failure or the like due to a temporary failure or the like of hardware or the like is assumed, the CPU 230 retries copying of the write data between the controllers. First, the CPU 230 initializes the number of retries (step 1119), and in a manner comparable to step 1116, retries copying (by DMA or the like) of the write data from the write side of the host controller to the write side of the other controller (step 1120). Subsequently, in a manner comparable to step 1117, the CPU 230 verifies the guarantee code of the write data by the CPU 230 (step 1121). Next, the CPU 230 determines whether the retry has ended normally (step 1122). This determination is made based on a result of the retried copy execution, a data guarantee code verification result, or the like. When the retry has ended normally (step 1122: Yes), processing proceeds to step 1125. When the retry has not ended normally (step 1122: No), the CPU 230 adds the number of retries (step 1123) and determines whether the number of retries has exceeded a threshold (step 1124). When the number of retries has exceeded the threshold (step 1124: Yes), processing proceeds to step 1129. When the number of retries has not exceeded the threshold (step 1124: No), the CPU 230 proceeds to step 1120 to once again retry the copying.

When the retry has ended normally (step 1122: Yes) or in order to show that effective dirty data is stored in the write side after S1118: Yes, the CPU 230 configures a dirty block map in the write request range of the write side of the other controller to ON (step 1125).

Next, the CPU 230 clears (cancels) the suspended state 2 of the error state of the other controller 22 having received the write request (step 1126).

Next, the CPU 230 reports a normal end of the write request to the host computer 1 (step 1127).

Next, the CPU 230 executes a queue transition in accordance with the data state (step 1128). The CPU 230 executes changing to parity ungenerated dirty and coupling to a head of a dirty (before generation) queue when the data state of the CS area management table 33 is clean, executes recoupling to a head of a queue even when coupling has already been performed to a dirty (before generation) queue, and the like.

On the other hand, when step 1113: No (when storing of the write data in the cache area of the host controller had not ended normally), when step 1124: Yes (when retries of copying (by DMA or the like) of the write data from the write side of the host controller to the write side of another controller has exceeded a threshold), when step 1204: No (when storing of the write data in the buffer area of the host controller had not ended normally in a write two-stage transfer to be described later), or when step 1212: Yes (when retries of copying (by DMA or the like) of the write data from a BS area allocated by the host controller to the write side of the host controller has exceeded a threshold in a write two-stage transfer to be described later), the CPU 230 reports an erroneous end of the write request to the host computer 1 (step 1129) and starts a data transfer suspension recovery process with respect to the write request range (step 1130).

Finally, the CPU 230 determines the presence or absence of unreleased BS areas (step 1131). When executing a read two-stage transfer to be described later, since the BS area reserved in step 1200 remains in the host controller in an unreleased state, the CPU 230 releases the unreleased BS area (step 1132).

In the case of step 1108: No in FIG. 18, as shown in FIG. 20, the CPU 230 reserves a BS area of the host controller (step 1200) and the FE-I/F 210 adds a guarantee code to the write data and stores the write data in the BS area allocated by the host controller (step 1201).

Next, the CPU 230 determines whether there is parity ungenerated dirty data in the write side of the host controller (step 1202).

When there is no parity ungenerated dirty data (step 1202: No), since an attempt is being made to store the write data in a newly allocated write side and the write data is to be discarded if the transfer of the write data fails, the CPU 230 skips verification of a data guarantee code at the controller 22 having received the write request. Subsequently, the processing proceeds to step 1205.

When there is parity ungenerated dirty data (step 1202: Yes), the CPU 230 verifies the guarantee code of the write data stored in the reserved BS area (step 1203).

Next, the CPU 230 determines whether the storing of the write data in the BS area of the host controller has normally ended (step 1204). This determination is made based on a data transfer execution result of the FE-I/F 210, a data guarantee code verification result, or the like.

When storing has not ended normally, (step 1204: No), processing proceeds to step 1129 in FIG. 19.

When storing has ended normally, (step 1204: Yes), the CPU 230 configures an error state of the host controller 22 having received the write request to the suspended state 1 and configures an error state of the other controller to the suspended state 2 (step 1205).

Next, the write data is copied (by DMA or the like) from the BS area of the host controller to the write side of the host controller (step 1206).

Next, the CPU 230 determines whether the storing of the write data in the CS area of the host controller has normally ended (step 1207). This determination is made based on a result of copy execution in step 1205 or the like.

When storing has ended normally (step 1207: Yes), processing proceeds to step 1213.

When storing has not ended normally (step 1207: No), since a data transfer failure or the like due to a temporary failure or the like of hardware or the like is assumed, the CPU 130 retries copying of the write data from the BS area to the CS area of the host controller. First, the CPU 230 initializes the number of retries (step 1208), and in a manner comparable to step 1206, retries copying (by DMA or the like) of the write data from the BS area to the write side of the host controller (step 1209). Next, the CPU 230 determines whether the retry has ended normally (step 1210). This determination is made based on a result of the retried copy execution or the like. When the retry has ended normally (step 1210: Yes), processing proceeds to step 1213. When the retry has not ended normally (step 1210: No), the CPU 230 adds the number of retries (step 1211) and determines whether the number of retries has exceeded a threshold (step 1212). When the number of retries has exceeded the threshold (step 1212: Yes), processing proceeds to step 1129 in FIG. 19. When the number of retries has not exceeded the threshold (step 1212: No), the CPU 230 proceeds to step 1209 to once again retry the copying.

Next, in order to show that effective dirty data is stored in the write side, the CPU 230 configures bits corresponding to an area in which the dirty data is stored in a dirty block map corresponding to the write side of the host controller to ON (step 1213).

Next, the CPU 230 clears (cancels) the suspended state 1 of the error state of the host controller having received the write request (step 1214). Subsequently, the CPU 230 proceeds to step 1116 in FIG. 19.

This concludes the description of the write processing.

Figure 21:
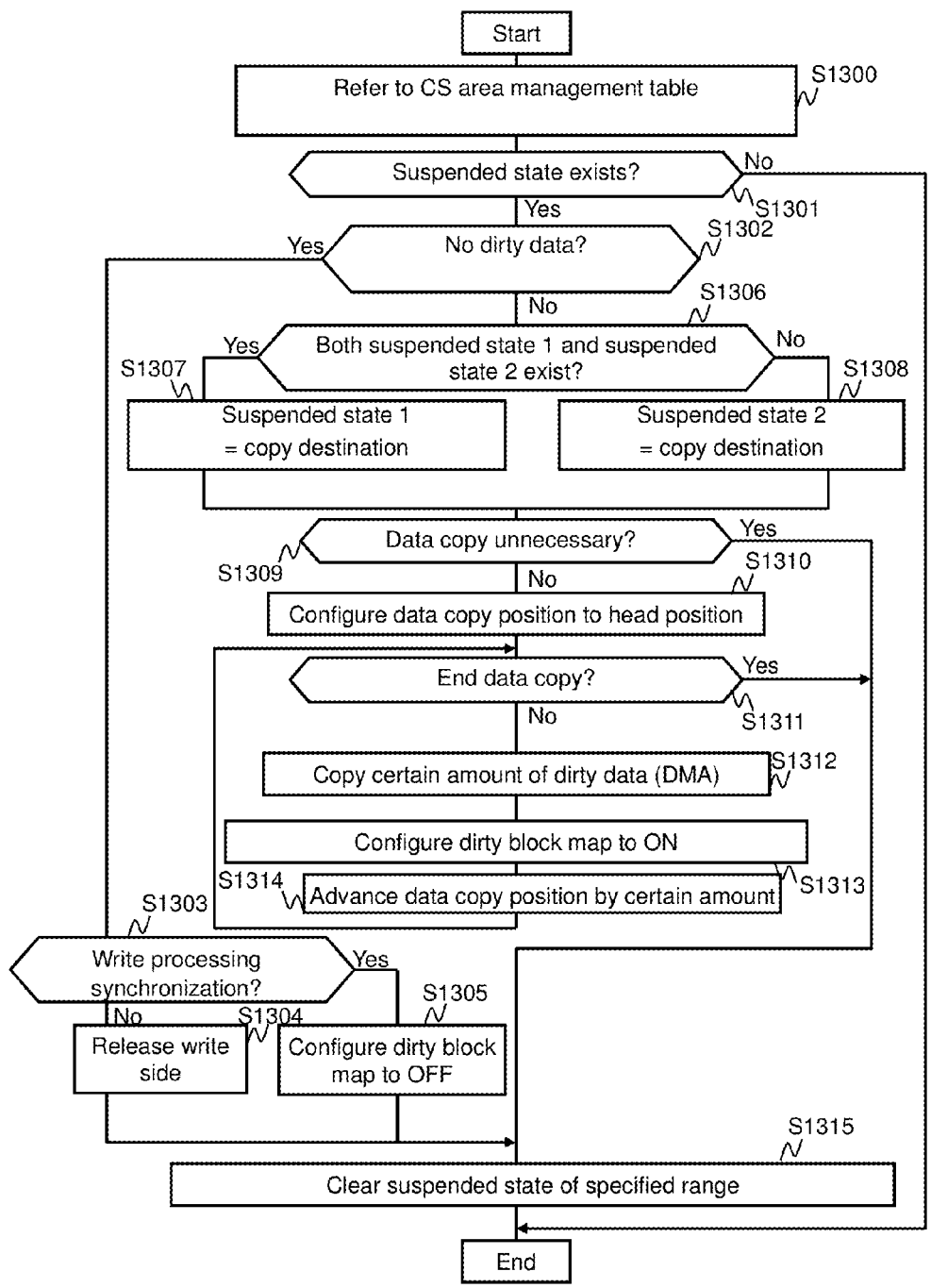
FIG. 21 shows an example of a suspended state recovery process according to the example.

FIG. 21 shows an example of a flow of the suspended state recovery process according to the example.

The suspended state recovery process is realized by having the CPU 230 execute the suspended state recovery program 52. Starting factors of the suspended state recovery process include read processing synchronization (a start from read processing) and write processing synchronization (a start from write processing). However, the suspended state recovery process may also start from asynchronous processing which refers to processing that is asynchronous with I/O requests (read/write requests) from the host computer 1 (for example, a start from a parity generating process or a start from a periodical failure monitoring process). In addition, the suspended state recovery process differs according to a suspended state of the cache area 244 (refer to FIG. 15 for details).

First, the CPU 230 refers to a CS area management table corresponding to the starting factor of the suspended state recovery process and to a CS area belonging to a specified range (step 1300). This is executed with respect to the CS area management tables of both a host controller and another controller. In addition, in the description of FIG. 21, for example, the "specified range" may be an address range (for example, a LUN, an LBA (Logical Block Address), or a data length) specified in an I/O request received from the host computer 1 when the starting factor is read processing synchronization or write processing synchronization and may be a range arbitrarily specified by the CPU 230 (the suspended state recovery program 52) when the starting factor is neither read processing synchronization nor write processing synchronization. Hereinafter, in order to facilitate understanding, in the description of FIG. 21, a CS area belonging to a specified range will be referred to as a "specified CS area", whereby it is assumed that one specified CS area exists in one controller.

Next, the CPU 230 determines whether a suspended state exists (whether or not the error state 332 is the suspended state 1 or 2) in a CS area management table corresponding to the specified CS area of at least one controller (step 1301).

When a suspended state does not exist (step 1301: No), the CPU 230 ends the suspended state recovery process. In this case, it is conceivable that the suspended state recovery process has been started in a state where a suspended state does not exist, a suspended state recovery process that had been started at a timing other than the starting factors described above has already rectified the suspended state, or the like.

When a suspended state exists (step 1301: Yes), the CPU 230 determines whether there is no parity ungenerated dirty data corresponding to the write request in the specified CS area corresponding to the suspended state 2 (a write side of a cache area of a controller for which the suspended state 2 is configured) (step 1302). Moreover, "a suspended state exists" means that at least the suspended state 2 exists among the suspended states 1 and 2. This is because both the suspended states 1 and 2 are tentatively configured (S1109 or S1205) in the write processing (FIGS. 18 to 20) and, subsequently, the suspended state 1 is inevitably cleared first among the suspended states 1 and 2 (S1115 or S1214).

When there is no parity ungenerated dirty data in the specified CS area corresponding to the suspended state 2 (step 1302: Yes), the CPU 230 is attempting to store the write data in a newly allocated write side and the write data corresponding to a write request having ended erroneously is discarded (step 1304). However, when the starting factor is write processing synchronization (1303: Yes), since write processing is scheduled to be performed after the suspended state recovery process, the CPU 230 configures a dirty block map of a data transfer source to OFF (on the assumption of a case where only the suspended state 2 is configured) for the purpose of reusing a write side that has already been reserved (step 1305). Subsequently, the processing proceeds to step 1315.

Next, the CPU 230 determines whether both the suspended state 1 and the suspended state 2 exist when both CS area management tables 33 corresponding to respective specified CS areas of the host controller and the other controller are observed as a whole (step 1306).

When both the suspended state 1 and the suspended state 2 exist (step 1306: Yes), since there is a possibility that parity ungenerated dirty data in the write side of the controller having received the write request is destroyed, the CPU 230 configures any of the CS areas in the controller including a specified CS area corresponding to the suspended state 1 (in other words, the host controller) as a data copy destination and configures a specified CS area corresponding to the suspended state 2 (in other words, a specified CS area of the other controller) as a data copy source (step 1307). Subsequently, the processing proceeds to step 1309. Moreover, the data copy destination may be the specified CS area corresponding to the suspended state 1 itself or, in other words, the write side storing the parity ungenerated dirty data that is possibly destroyed.

When one of the suspended state 1 and the suspended state 2 exists (step 1306: No) or, in other words, when only the suspended state 2 exists, since copying of write data from the specified CS area (the write side) of the host controller to the specified CS area (the write side) of the other controller has conceivably failed, the CPU 230 configures any of the CS areas in the controller including a specified CS area corresponding to the suspended state 2 (in other words, the other controller) as a data copy destination and configures a specified CS area with which the suspended state 2 is not associated (in other words, a specified CS area in the host controller) as a data copy source (step 1308). Moreover, the data copy destination may be the specified CS area corresponding to the suspended state 2 itself.

Next, the CPU 230 determines whether conditions under which data copy is unnecessary are satisfied (step 1309). When the conditions under which data copy is unnecessary are not satisfied, the CPU 230 performs a data copy from a copy source to a copy destination (steps 1310 to 1314). However, when the conditions under which data copy is unnecessary are satisfied, the CPU 230 performs step 1315 without performing such a data copy. Moreover, data recovery can be achieved without incident even when the suspended state recovery process is executed without performing this determination (or uniformly determining that the conditions under which data copy is unnecessary are not satisfied (step 1309: No)). Specific determination conditions are that the starting factor is write processing synchronization AND the controller having received the current write request includes a specified CS area that is the data copy destination AND a write request range (an address range specified in the write request) upon data transfer suspension is included in a current write request range. In this case, a state of the parity ungenerated dirty data of the write side that is recovered by the data copying process of steps 1310 to 1314 is to be overwritten by write processing of a current write request that is scheduled to be executed.

Next, due to the data copying process of steps 1310 to 1314, the write side to which a data transfer had possibly been suspended is overwritten by parity ungenerated dirty data of a normal write side of another controller and recovery of an error state is performed.

The CPU 230 configures a data copy position to a head of a read/write range which is specified as an initial position (step 1310) and determines whether copying of all data in the specified range has been completed (step 1311).

When the copying of data has not been completed (step 1311: No), a certain amount of dirty data is copied (by DMA or the like) from the write side of the data transfer source to the write side of the data transfer destination (step 1312). At this point, only data in a range for which a dirty block map of a copy source is configured to ON need be copied. Next, in order to show that effective dirty data is stored in the write side, the CPU 230 configures a dirty block map of a write request range of a write side of a copy destination controller to ON (in accordance with the ON configuration of the dirty block map of the copy source) (step 1313). Next, the CPU 230 advances the data copy position by a certain amount corresponding to the copy amount (step 1314). Subsequently, the processing proceeds to step 1311.

When the copying of data is completed (step 1311: Yes), the CPU 230 clears the suspended state corresponding to the specified CS area (step 1315) and ends the suspended state recovery process.

While an example has been described above, the present invention is not limited to the example above.

For example, although not shown, when the copying of step 1312 fails, copying may be retried using another method if a plurality of copying methods (for example, if a plurality of DMA engines are mounted) are provided in advance, or the CPU 230 may release the write side of the copy destination and retry copying by using another area of the cache area of the same controller which has been re-reserved from a free queue as a write side. When the suspended state still cannot be rectified, a parity of the parity ungenerated dirty data of the write side of the copy source may be generated, the parity ungenerated dirty data of the copy source and the new parity may be destaged in an RG, and data in the write sides of the copy source and the copy destination may be discarded.

REFERENCE SIGNS LIST

1 Host computer
2 Storage system
21 Storage control apparatus
22 Controller
210 FE-I/F
230 CPU
240 Memory
242 Buffer area
243 Management table area
244 Cache area

The invention claimed is:

1. A storage system comprising:
a storage device group constituted by one or more storage devices;
a first controller which is coupled to the storage device group and a host computer and which includes a first buffer area and a first cache area; and
a second controller which is coupled to the storage device group and the host computer and which includes a second buffer area and a second cache area,
wherein the first controller is configured to receive a first write request from the host computer, and to determine whether a cache memory direct transfer can be executed or not, based on presence or absence of cache data in the first cache area and the second cache area and, if present, a data state of the cache data,
wherein the first controller is configured to execute a two-stage transfer if the cache memory direct transfer cannot be executed,
wherein the first controller is configured, for executing the cache memory direct transfer, to store first write data in accordance with the first write request in a first cache sub area that is any of cache sub areas in the first cache area without involving the first buffer area, transfer the first write data stored in the first cache sub area to the second controller in order to store the first write data in a second cache sub area that is any of cache sub areas in the second cache area without involving the second buffer area, and write the first write data in the first cache sub area to the storage device group based on a specified range in accordance with a write destination that is specified in the write request,
wherein the first controller is configured, for executing the two-stage transfer, to store the first write data in accordance with the first write request in the first buffer area and then transfer the first write data from the first buffer area to the first cache sub area, transfer the first write data stored in the first cache sub area to the second controller in order to store the first write data in the second buffer area and then transfer the first write data from the second buffer area to the second cache sub area, and write the first write data in the first cache sub area to the storage device group based on the specified range in accordance with the write destination that is specified in the write request, wherein the first controller is configured to manage whether or not a state of the first cache sub area is a first suspended state that is cleared when storing of the first write data in the first cache sub area is successful, and wherein the first or second controller is configured to manage whether or not a state of the second cache sub area is a second suspended state that is cleared when a transfer of the write data from the first cache sub area to the second cache sub area is successful, wherein the first controller is configured to perform a suspended state recovery process, and wherein the suspension recovery process includes:
  determining whether or not the first cache sub area is in the first suspended state and the second cache sub area is in the second suspended state;
  configuring the first cache sub area as a copy destination, configuring the second cache sub area as a copy source, copying data from the copy source to the copy destination, and clearing the first and second suspended states that respectively correspond to the first and second cache sub areas when the first cache sub area is in the first suspended state and the second cache sub area is in the second suspended state; and
  configuring the second cache sub area as a copy destination, configuring the first cache sub area as a copy source, copying data from the copy source to the copy destination, and clearing the second suspended state that corresponds to the second cache sub area when the first cache sub area is not in the first suspended state and the second cache sub area is in the second suspended state;

wherein the first controller is configured, for executing the cache memory direct transfer, to transfer, to the second controller, the first write data to be transferred to the second controller without verifying a guarantee code that is attached to the first write data, and the second controller is configured to receive the first write data and to verify the guarantee code that is attached to the first write data, and wherein the first controller is configured, for executing the two-stage transfer, to transfer, to the second controller, the first write data to be transferred to the second controller after verifying the guarantee code that is attached to the first write data.

2. The storage system according to claim 1,
wherein the suspended state recovery process further includes determining whether or not conditions under which copying is unnecessary are satisfied, and
wherein, when the conditions under which copying is unnecessary are not satisfied, the first controller is configured to perform copying of data from the copy source to the copy destination, and when the conditions under which copying is unnecessary are satisfied, the first controller is configured to clear the first and second suspended states that correspond to the first and second cache sub areas or to clear the second suspended state that corresponds to the second cache sub area without copying data from the copy source to the copy destination.

3. The storage system according to claim 2,
wherein a case where the conditions under which copying is unnecessary are satisfied is a case where the suspended state recovery process is started from write processing in accordance with the write request, the first controller includes a cache sub area that is a copy destination, and a specified range in accordance with a write destination that is specified in a previous write request corresponding to a transfer that had caused the second suspended state is included in a specified range in accordance with a write destination that is specified in the first write request.

4. The storage system according to claim 1,
wherein, when a first read request is received from the host computer, the first controller is configured not to perform a transfer of first read data in accordance with the first read request from the first cache sub area to the host computer when the first cache sub area is in the first suspended state even if the first read data is within the first cache sub area.

5. The storage system according to claim 4,
wherein, when the first read data is first dirty data that is data not written to the storage device group, the first controller is configured to transfer data, which is in a cache sub area not in the first suspended state and which corresponds to the first dirty data, to the host computer.

6. The storage system according to claim 5,
wherein the first controller is configured to receive a second write request or a second read request,
wherein, when the second write request is received, the first controller is configured to perform the suspended state recovery process with respect to the first cache sub area that is in the first suspended state before processing the second write request when a storing destination of second write data in accordance with the second write request is the first cache sub area, and
wherein, when the second read request is received, the first controller is configured to perform the suspended state recovery process with respect to the first cache sub area that is in the first suspended state asynchronously with the processing of the second read request even if second read data in accordance with the second read request is data in the first cache sub area.

7. The storage system according to claim 1,
wherein the first controller is configured to store the first write data in the first buffer area and to store in the first cache sub area the first write data from the first buffer area when an internal function for copying data between logical volumes is being executed.

8. The storage system according to claim 1,
wherein the first controller is configured to release the first cache sub area that is a storing destination of the first write data in the suspended state recovery process when data stored in the first cache sub area is clean data that is data already written to the storage device group.

9. The storage system according to claim 1,
wherein the first controller is configured to perform data copying between a certain cache sub area and the first cache sub area that is in the first suspended state in order to restore data in the first cache sub area, and
wherein the first controller is configured to skip the data copying when a cache sub area that is a copy destination is the first cache sub area and a write range upon determination of the first suspended state is included in the specified range of the first write request.

10. The storage system according to claim 1,
wherein the first controller is configured to include a first memory and the second controller is configured to include a second memory, and
wherein the first cache area and the first buffer area are consolidated in the first memory, and the second cache area and the second buffer area are consolidated in the second memory.

11. The storage system according to claim 1,
wherein the cache memory direct transfer can be executed, if there is absence of cache data in the first cache area and the second cache area, or if there is presence of cache data in at least one of the first cache area or the second cache area and the cache data is clean or parity generated dirty.

12. A storage control method of a storage system: a storage device constituted by one or more storage devices; a first controller which is coupled to the storage device and a host computer and which includes a first buffer area and a first cache area; and a second controller which is coupled to the storage device group and the host computer and which includes a second buffer area and a second cache area, wherein the first controller is configured to receive a write request from the host computer, and to determine whether a cache memory direct transfer can be executed or not, based on presence or absence of cache data in the first cache area and the second cache area and, if present, a data state of the cache data, wherein the first controller is configured to execute a two-stage transfer if the cache memory direct transfer cannot be executed, wherein the first controller is configured, for executing the cache memory direct transfer, store write data in accordance with the write request in a first cache sub area that is any of cache sub areas in the first cache area without involving the first buffer area, transfer the write data stored in the first cache sub area to the second controller in order to store the write data in a second cache sub area that is any of cache sub areas in the second cache area without involving the second buffer area, and write the write data in the first cache sub area to the storage device group, wherein the first controller is configured, for executing the two-stage transfer, to store the first write data in accordance with the first write request in the first buffer area and then transfer the first write data from the first buffer area to the first cache sub area, transfer the first write data stored in the first cache sub area to the second controller in order to store the first write data in the second buffer area and then transfer the first write data from the second buffer area to the second cache sub area, and write the first write data in the first cache sub area to the storage device group based on the specified range in accordance with the write destination that is specified in the write request,
the method comprising:
managing, by the first controller, whether or not a state of a first cache sub area is a first suspended state that is cleared when storing of first write data in the first cache sub area is successful, and managing, by the first or second controller, whether or not a state of a second cache sub area is a second suspended state that is cleared when a transfer of write data from the first cache sub area to the second cache sub area is successful; and
performing, by the first controller, a suspended state recovery process,
wherein the suspended recovery process includes:
determining whether or not the first cache sub area is in the first suspended state and the second cache sub area is in the second suspended state;
configuring the first cache sub area as a copy destination, configuring the second cache sub area as a copy source, copying data from the copy source to the copy destination, and clearing the first and second suspended states that respectively correspond to the first and second cache sub areas when the first cache sub area is in the first suspended state and the second cache sub area is in the second suspended state; and
configuring the second cache sub area as a copy destination, configuring the first cache sub area as a copy source, copying data from the copy source to the copy destination, and clearing the second suspended state that corresponds to the second cache sub area when the first cache sub area is not in the first suspended state and the second cache sub area is in the second suspended state;
wherein the method further comprises, for executing the cache memory direct transfer, configuring to transfer to the second controller, by the first controller, the first write data to be transferred to the second controller without verifying a guarantee code that is attached to the first write data, and configuring, by the second controller, to receive the first write data and to verify the guarantee code that is attached to the first write data; and
wherein the method further comprises, for executing the two-stage transfer, configuring to transfer to the second controller, by the first controller, the first write data to be transferred to the second controller after verifying the guarantee code that is attached to the first write data.

13. The method according to claim 12,
wherein the suspended state recovery process further includes determining whether or not conditions under which copying is unnecessary are satisfied, and
wherein the method further comprises:
when the conditions under which copying is unnecessary are not satisfied, configuring, by the first controller, to perform copying of data from the copy source to the copy destination, and
when the conditions under which copying is unnecessary are satisfied, configuring, by the first controller, to clear the first and second suspended states that correspond to the first and second cache sub areas or to clear the second suspended state that corresponds to the second cache sub area without copying data from the copy source to the copy destination.

14. The method according to claim 13,
wherein a case where the conditions under which copying is unnecessary are satisfied is a case where the suspended state recovery process is started from write processing in accordance with the write request, the first controller includes a cache sub area that is a copy destination, and a specified range in accordance with a write destination that is specified in a previous write request corresponding to a transfer that had caused the second suspended state is included in a specified range in accordance with a write destination that is specified in the first write request.

15. A storage system comprising:
a storage device group constituted by one or more storage devices;
a first controller which is coupled to the storage device group and a host computer and which includes a first buffer area and a first cache area; and a second controller which is coupled to the storage device group and the host computer and which includes a second buffer area and a second cache area, wherein the first controller is configured to receive a first write request from the host computer, and to determine whether a cache memory direct transfer can be executed or not, based on presence or absence of cache data in the first cache area and the second cache area and, if present, a data state of the cache data, wherein the first controller is configured to execute a two-stage transfer if the cache memory direct transfer cannot be executed, wherein the first controller is configured, for executing the cache memory direct transfer, to store first write data in accordance with the first write request in a first cache sub area that is any of cache sub areas in the first cache area without involving the first buffer area, transfer the first write data stored in the first cache sub area to the second controller in order to store the first write data in a second cache sub area that is any of cache sub areas in the second cache area without involving the second buffer area, and write the first write data in the first cache sub area to the storage device group based on a specified range in accordance with a write destination that is specified in the write request, wherein the first controller is configured, for executing the two-stage transfer, to store the first write data in accordance with the first write request in the first buffer area and then transfer the first write data from the first buffer area to the first cache sub area, transfer the first write data stored in the first cache sub area to the second controller in order to store the first write data in the second buffer area and then transfer the first write data from the second buffer area to the second cache sub area, and write the first write data in the first cache sub area to the storage device group based on the specified range in accordance with the write destination that is specified in the write request, wherein the first controller is configured to manage whether or not a state of the first cache sub area is a first suspended state that is cleared when storing of the first write data in the first cache sub area is successful, and wherein the first or second controller is configured to manage whether or not a state of the second cache sub area is a second suspended state that is cleared when a transfer of the write data from the first cache sub area to the second cache sub area is successful, wherein the first controller is configured to perform a suspended state recovery process, and wherein the suspension recovery process includes:
determining whether or not the first cache sub area is in the first suspended state and the second cache sub area is in the second suspended state;
configuring the first cache sub area as a copy destination, configuring the second cache sub area as a copy source, copying data from the copy source to the copy destination, and clearing the first and second suspended states that respectively correspond to the first and second cache sub areas when the first cache sub area is in the first suspended state and the second cache sub area is in the second suspended state; and
configuring the second cache sub area as a copy destination, configuring the first cache sub area as a copy source, copying data from the copy source to the copy destination, and clearing the second suspended state that corresponds to the second cache sub area when the first cache sub area is not in the first suspended state and the second cache sub area is in the second suspended state;

wherein the suspended state recovery process further includes determining whether or not conditions under which copying is unnecessary are satisfied;

wherein, when the conditions under which copying is unnecessary are not satisfied, the first controller is configured to perform copying of data from the copy source to the copy destination, and when the conditions under which copying is unnecessary are satisfied, the first controller is configured to clear the first and second suspended states that correspond to the first and second cache sub areas or to clear the second suspended state that corresponds to the second cache sub area without copying data from the copy source to the copy destination; and wherein a case where the conditions under which copying is unnecessary are satisfied is a case where the suspended state recovery process is started from write processing in accordance with the write request, the first controller includes a cache sub area that is a copy destination, and a specified range in accordance with a write destination that is specified in a previous write request corresponding to a transfer that had caused the second suspended state is included in a specified range in accordance with a write destination that is specified in the first write request.

16. The storage system according to claim 15, wherein, when a first read request is received from the host computer, the first controller is configured not to perform a transfer of first read data in accordance with the first read request from the first cache sub area to the host computer when the first cache sub area is in the first suspended state even if the first read data is within the first cache sub area.

17. The storage system according to claim 16, wherein, when the first read data is first dirty data that is data not written to the storage device group, the first controller is configured to transfer data, which is in a cache sub area not in the first suspended state and which corresponds to the first dirty data, to the host computer.

18. The storage system according to claim 17, wherein the first controller is configured to receive a second write request or a second read request, wherein, when the second write request is received, the first controller is configured to perform the suspended state recovery process with respect to the first cache sub area that is in the first suspended state before processing the second write request when a storing destination of second write data in accordance with the second write request is the first cache sub area, and wherein, when the second read request is received, the first controller is configured to perform the suspended state recovery process with respect to the first cache sub area that is in the first suspended state asynchronously with the processing of the second read request even if second read data in accordance with the second read request is data in the first cache sub area.

19. The storage system according to claim 15, wherein the first controller is configured to release the first cache sub area that is a storing destination of the first write data in the suspended state recovery process when data stored in the first cache sub area is clean data that is data already written to the storage device group.

20. The storage system according to claim 15,
wherein the cache memory direct transfer can be executed, if there is absence of cache data in the first cache area and the second cache area, or if there is presence of cache data in at least one of the first cache area or the second cache area and the cache data is clean or parity generated dirty.

* * * * *